US012609063B2

(12) United States Patent
Guo et al.

(10) Patent No.: US 12,609,063 B2
(45) Date of Patent: Apr. 21, 2026

(54) GATE DRIVING CIRCUIT AND DRIVING METHOD THEREOF, AND DISPLAY DEVICE

(71) Applicant: KunShan Go-Visionox Opto-Electronics Co., Ltd, Jiangsu (CN)

(72) Inventors: Enqing Guo, Kunshan (CN); Cuili Gai, Kunshan (CN); Junfeng Li, Kunshan (CN); Kangguan Pan, Kunshan (CN); Yun Cheng, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 18/928,569

(22) Filed: Oct. 28, 2024

(65) Prior Publication Data

US 2025/0166541 A1 May 22, 2025

(30) Foreign Application Priority Data

Nov. 20, 2023 (CN) ......................... 202311549993.3

(51) Int. Cl.
*G09G 3/20* (2006.01)

(52) U.S. Cl.
CPC ....... *G09G 3/20* (2013.01); *G09G 2310/0267* (2013.01); *G09G 2310/0286* (2013.01); *G09G 2310/08* (2013.01); *G09G 2330/021* (2013.01)

(58) Field of Classification Search
CPC .... G09G 3/20; G09G 3/32; G09G 2300/0426; G09G 2310/0267; G09G 2310/0286; G09G 2310/08; G09G 2330/021; H10D 30/6757
See application file for complete search history.

(56) References Cited

U.S. PATENT DOCUMENTS

2021/0241706 A1 8/2021 Huang et al.

FOREIGN PATENT DOCUMENTS

| | | | |
|---|---|---|---|
| CN | 106847201 | A | 6/2017 |
| CN | 207867875 | U | 9/2018 |
| JP | 4389284 | B2 * | 12/2009 |
| JP | 4608982 | B2 * | 1/2011 |
| KR | 1020180074786 | A | 7/2018 |

(Continued)

OTHER PUBLICATIONS

Office Action issued on Feb. 20, 2025, in corresponding Korean Application No. 10-2024-0140177, 14 pages.

(Continued)

*Primary Examiner* — Julie Anne Watko
(74) *Attorney, Agent, or Firm* — Maier & Maier, PLLC

(57) ABSTRACT

A gate driving circuit and a driving method thereof, and a display device that belong to the field of display technology. The gate driving circuit includes an input module and a storage module. The input module is connected to each of a first node and a signal input terminal of the gate driving circuit and configured to control the potential of the first node according to the potential of the signal input terminal. An input terminal of the storage module is connected to the first node. The storage module is configured to store the potential of the first node and control the potential of an output terminal of the storage module according to the potential of the first node.

20 Claims, 12 Drawing Sheets

(56) References Cited

FOREIGN PATENT DOCUMENTS

| | | | | |
|---|---|---|---|---|
| KR | 1020230056768 | A | | 4/2023 |
| KR | 1020230087564 | A | | 6/2023 |
| WO | WO 2013/002228 | A | * | 3/2013 |

OTHER PUBLICATIONS

Office Action issued on Jul. 18, 2025, in corresponding Korean Application No. 10-2024-0140177, 6 pages.

* cited by examiner

GATE DRIVING CIRCUIT AND DRIVING METHOD THEREOF, AND DISPLAY DEVICE

CROSS-REFERENCE TO RELATED APPLICATION

This application claims priority to Chinese Patent Application No. 202311549993.3 filed Nov. 20, 2023, the disclosure of which is incorporated herein by reference in its entirety.

TECHNICAL FIELD

The present invention relates to the field of display technology and, in particular, to a gate driving circuit and a driving method thereof, and a display device.

BACKGROUND

With the development of display technology, customers have increasingly high requirements for display panels. Existing gate driving circuits can no longer meet the design of display panels. Therefore, a better gate driving circuit is urgently needed.

SUMMARY

The present invention provides a gate driving circuit and a driving method thereof, and a display device to reduce the power consumption of the gate driving circuit.

In a first aspect, embodiments of the present invention provide a gate driving circuit. The gate driving circuit includes an input module and a storage module.

The input module is connected to each of a first node and a signal input terminal of the gate driving circuit and configured to control a potential of the first node according to a potential of the signal input terminal.

An input terminal of the storage module is connected to the first node. The storage module is configured to store the potential of the first node and control a potential of an output terminal of the storage module according to the potential of the first node.

Optionally, the gate driving circuit further includes an output module connected between the output terminal of the storage module and a signal output terminal of the gate driving circuit and configured to control a potential of the signal output terminal of the gate driving circuit according to the potential of the output terminal of the storage module.

Preferably, the input module is configured to transmit a potential hop of the signal input terminal to the first node in a delayed manner.

Preferably, the storage module is configured to invert the potential of the first node and then outputs the inverted potential of the first node to the output terminal of the storage module.

Preferably, the output module is configured to invert the potential of the output terminal of the storage module and then outputs the inverted potential of the output terminal of the storage module to the signal output terminal of the gate driving circuit.

Optionally, the storage module includes a first inversion unit and a second inversion unit.

A control terminal of the first inversion unit is connected to the first node. A first input terminal of the first inversion unit is connected to a first power terminal. A second input terminal of the first inversion unit is connected to a second power terminal. An output terminal of the first inversion unit is connected to the output terminal of the storage module.

A control terminal of the second inversion unit is connected to the output terminal of the storage module. A first input terminal of the second inversion unit is connected to the first power terminal. A second input terminal of the second inversion unit is connected to the second power terminal. An output terminal of the second inversion unit is connected to the first node.

Preferably, the first inversion unit includes a first transistor and a second transistor. A gate of the first transistor and a gate of the second transistor are each connected to the first node. A first electrode of the first transistor is connected to the first power terminal. A first electrode of the second transistor is connected to the second power terminal. A second electrode of the first transistor and a second electrode of the second transistor are each connected to the output terminal of the first inversion unit.

The second inversion unit includes a third transistor and a fourth transistor. Agate of the third transistor and a gate of the fourth transistor are each connected to the output terminal of the storage module. A first electrode of the third transistor is connected to the first power terminal. A first electrode of the fourth transistor is connected to the second power terminal. A second electrode of the third transistor and a second electrode of the fourth transistor are each connected to the output terminal of the second inversion unit.

A channel type of the first transistor is opposite to a channel type of the second transistor. A channel type of the third transistor is opposite to a channel type of the fourth transistor. The channel type of the first transistor is the same as the channel type of the third transistor.

Preferably, the second transistor and the fourth transistor are each an n-type transistor.

Preferably, the second transistor and the fourth transistor each include a second gate. The second gate of the second transistor and the second gate of the fourth transistor are each connected to a third power terminal.

Optionally, the gate driving circuit further includes a transmission control module connected between the first node and the output terminal of the second inversion unit and configured to control whether the first node communicates with the output terminal of the second inversion unit.

Preferably, the transmission control module includes a fifth transistor connected between the first node and the output terminal of the second inversion unit. A gate of the fifth transistor is connected to a second clock terminal.

Preferably, the transmission control module includes a sixth transistor connected between the first node and the output terminal of the second inversion unit. A gate of the sixth transistor is connected to a first clock terminal.

A signal connected to the first clock terminal and a signal connected to the second clock terminal are mutually inverse signals. A channel type of the fifth transistor is opposite to a channel type of the sixth transistor.

Preferably, the sixth transistor is an n-type transistor.

Preferably, the sixth transistor includes a second gate. The second gate of the sixth transistor is connected to the third power terminal.

Optionally, the input module further includes an eighth transistor connected between the signal input terminal and the first node. A gate of the eighth transistor is connected to a second clock terminal.

Preferably, the input module further includes an eighth transistor connected between the signal input terminal and the first node. A gate of the eighth transistor is connected to a second clock terminal.

A signal connected to the first clock terminal and a signal connected to the second clock terminal are mutually inverse signals. A channel type of the seventh transistor is opposite to a channel type of the eighth transistor.

Preferably, the eighth transistor is an n-type transistor.

Preferably, the eighth transistor includes a second gate. The second gate of the eighth transistor is connected to the third power terminal.

Optionally, the output module includes a ninth transistor and a tenth transistor. A gate of the ninth transistor and a gate of the tenth transistor are each connected to the output terminal of the storage module. A first electrode of the ninth transistor is connected to a first power terminal. A first electrode of the tenth transistor is connected to a second power terminal. A second electrode of the ninth transistor and a second electrode of the tenth transistor are each connected to the signal output terminal of the gate driving circuit.

A channel type of the ninth transistor is opposite to a channel type of the tenth transistor.

Preferably, the tenth transistor is an n-type transistor.

Preferably, the tenth transistor includes a second gate. The second gate of the tenth transistor is connected to a third power terminal.

Optionally, a potential connected to the first power terminal is higher than a potential connected to the second power terminal. A potential connected to the third power terminal is lower than or equal to the potential connected to the second power terminal.

In a second aspect, embodiments of the present invention further provide a driving method of a gate driving circuit for driving the gate driving circuit provided in any embodiment of the present invention. The driving method includes the following.

In a first working mode, the input module is controlled to be turned on, where the input module transmits a potential of the signal input terminal to a first node, and the storage module controls a potential of the output terminal of the storage module according to a potential of the first node.

In a second working mode, the input module is controlled to be turned off, where the storage module stores the potential acquired by the first node before the input module is turned off, and the storage module controls the potential of the output terminal of the storage module according to the potential of the first node.

Optionally, the driving method of a gate driving circuit includes the following.

At a first stage, an input signal connected to the signal input terminal hops from a first potential to a second potential to control the gate driving circuit to perform the second working mode in which the input module is turned off, the first node maintains the first potential, and the storage module inverts the first potential into the second potential and then outputs the second potential.

At a second stage, the input signal maintains the second potential to control the gate driving circuit to perform the first working mode and the second working mode alternately, where in the first working mode, the input module is turned on and transmits the second potential of the input signal to the first node, and the storage module inverts the second potential into the first potential and then outputs the first potential; and in the second working mode, the input module is turned off, the first node maintains the second potential, and the storage module inverts the second potential into the first potential and then outputs the first potential.

At a third stage, the input signal hops from the second potential to the first potential to control the gate driving circuit to perform the second working mode in which the input module is turned off, the first node maintains the second potential, and the storage module inverts the second potential into the first potential and then outputs the first potential.

At a fourth stage, the input signal maintains the first potential to control the gate driving circuit to perform the first working mode and the second working mode alternately, where in the first working mode, the input module is turned on and transmits the first potential of the input signal to the first node, and the storage module inverts the first potential into the second potential and then outputs the second potential; and in the second working mode, the input module is turned off, the first node maintains the first potential, and the storage module inverts the first potential into the second potential and then outputs the second potential.

Optionally, the gate driving circuit includes an output module. In the first working mode and the second working mode, the output module inverts the potential of the output terminal of the storage module and then outputs the inverted potential of the output terminal of the storage module to a signal output terminal of the gate driving circuit.

Moreover/alternatively, the gate driving circuit includes a transmission control module configured to control whether a control terminal of a first inversion unit in the storage module communicates with an output terminal of a second inversion unit in the storage module; in the first working mode, the transmission control module is controlled to be turned off; and in the second working mode, the transmission control module is controlled to be turned on.

In a third aspect, embodiments of the present invention further provide a display device. The display device includes the gate driving circuit provided in any embodiment of the present invention.

The display device includes an input signal line and multi-level gate driving circuits connected in a cascade manner. A signal input terminal of a first-level gate driving circuit among the multi-level gate driving circuits is connected to the input signal line. A signal output terminal of a current-level gate driving circuit among the multi-level gate driving circuits is connected to a signal input terminal of a next-level gate driving circuit among the multi-level gate driving circuits.

Optionally, the gate driving circuit further includes a first clock terminal and a second clock terminal.

The display device further includes a first clock signal line and a second clock signal line. The first clock signal line is connected to a first clock terminal of the odd-level gate driving circuit and a second clock terminal of the even-level gate driving circuit. The second clock signal line is connected to a second clock terminal of the odd-level gate driving circuit and a first clock terminal of the even-level gate driving circuit.

Preferably, in a refresh frame, a signal transmitted by the first clock signal line and a signal transmitted by the second clock signal line are each a pulse signal.

Preferably, in a retention frame, a signal transmitted by the first clock signal line and a signal transmitted by the second clock signal line are each a direct current signal.

Preferably, on the same occasion, a signal transmitted by the first clock signal line and a signal transmitted by the second clock signal line are mutually inverse signals.

Preferably, a high-potential duty cycle of signals transmitted by the first clock signal line and a high-potential duty cycle of signals transmitted by the second clock signal line are each 50%.

Optionally, the display device further includes a driver chip.

The driver chip is connected to each of the first clock signal line and the second clock signal line.

Alternatively, the display device further includes an inverter. The driver chip is connected to an input terminal of the inverter and the first clock signal line. An output terminal of the inverter is connected to the second clock signal line.

The input module and the storage module are disposed in the gate driving circuit provided in embodiments of the present invention. The input module may be controlled to be turned on to adjust the potential of the first node based on the potential of the signal input terminal. The write information is supplied to the input terminal of the storage module so that the storage module adjusts the potential of the output terminal of the storage module according to the potential of the first node. The input module may be controlled to be turned off to disconnect the signal input terminal from the first node so that the storage module is in the latch state, thereby implementing the potential maintaining of the output terminal of the storage module. The structure of the gate driving circuit is simple and easy to implement, helping reduce the power consumption of the circuit. Moreover, the gate driving circuit uses the storage module to store signals. The storage module has the function of constantly maintaining the stored in the state of powering on. Therefore, the working state of the input module and the working state of the storage module in the retention frame do not need to be adjusted periodically as those in a refresh frame, thus effectively reducing the static power consumption of the circuit.

It is to be understood that the content described in this section is neither intended to identify key or critical features of embodiments of the present invention nor intended to limit the scope of the present invention. Other features of the present invention become easily understood through the description hereinafter.

BRIEF DESCRIPTION OF DRAWINGS

To illustrate solutions of embodiments of the present invention more clearly, the drawings used in the description of the embodiments are briefly described hereinafter. Apparently, the drawings described hereinafter illustrate part of the embodiments of the present invention, and those of ordinary skill in the art may obtain other drawings based on the drawings described hereinafter on the premise that no creative work is done.

DETAILED DESCRIPTION

To make solutions of the present invention better understood by those skilled in the art, solutions of embodiments of the present invention are described hereinafter clearly and completely in conjunction with drawings in embodiments of the present invention. Apparently, the embodiments described hereinafter are part, not all, of embodiments of the present invention. Based on embodiments of the present invention, all other embodiments obtained by those of ordinary skill in the art are within the scope of the present invention on the premise that no creative work is done.

It is to be noted that terms “first”, “second”, and the like in the description, claims, and drawings of the present invention are used for distinguishing between similar objects and are not necessarily used for describing a particular order or sequence. It is to be understood that data used in this manner are interchangeable in appropriate cases so that embodiments of the present invention described herein can be implemented in an order not illustrated or described herein. In addition, terms “comprising”, “including” and any other variations thereof are intended to encompass a non-exclusive inclusion.

Figure 1:
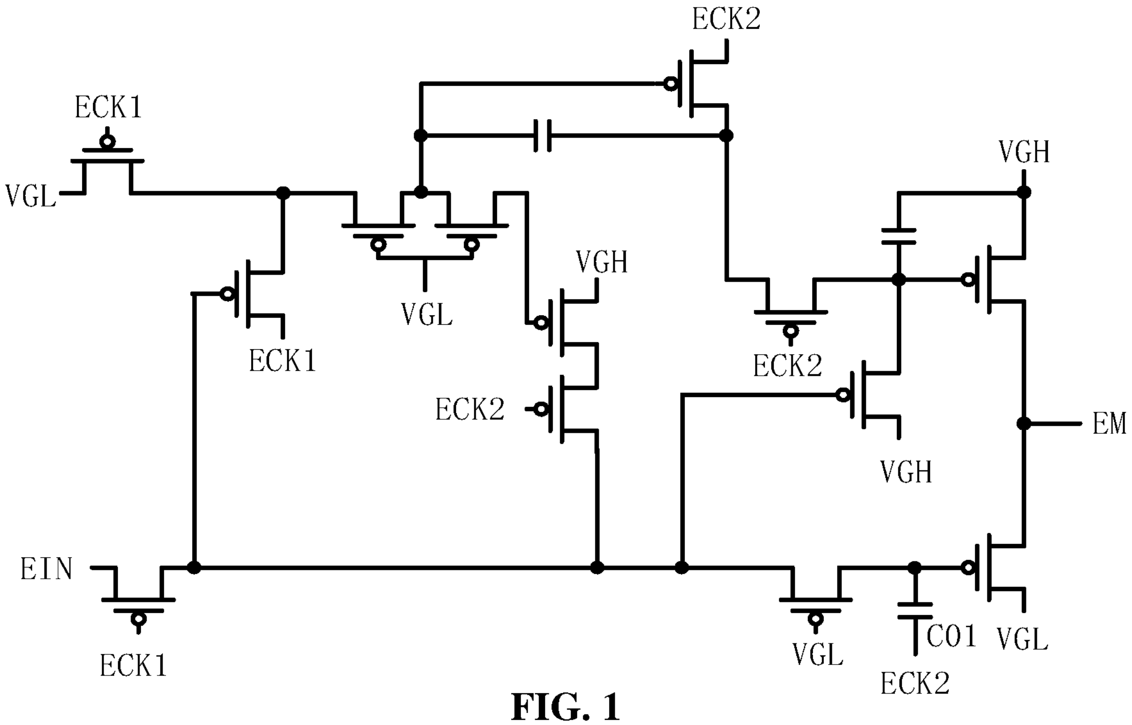
FIG. 1 (prior art)
FIG. 1 is a structural diagram of an existing light emission control circuit.

As mentioned in BACKGROUND, an existing gate driving circuit has a relatively high power consumption. The reason for this problem is exemplified hereinafter. In the related art, a gate driving circuit generally includes multiple transistors and multiple capacitors. As shown in FIG. 1, by way of example, a gate driving circuit is a light emission control circuit with a 13T3C architecture including thirteen transistors and three capacitors. Because a low-temperature polysilicon (LTPS) TFT has the advantages of high mobility and stable characteristics, an existing gate driving circuit is generally composed based on a p-type TFT to reduce technique cost. However, a relatively great number of elements are included in the existing gate driving circuit, resulting in a complex circuit structure, for example, the 13T3C architecture shown in FIG. 1 and leading to a relatively large circuit power consumption. Moreover, signal storage in the existing gate driving circuit depends on capacitors. Taking FIG. 1 as an example, during the circuit driving process, clock signals ECK1 and ECK2 are required to continuously jump to maintain the information stored in the capacitors. Especially in a retention frame in the low-frequency display mode, the clock signals still need to be pulse signals with continuous potential hopping, making the static power consumption of the circuit relatively large.

Figure 2:
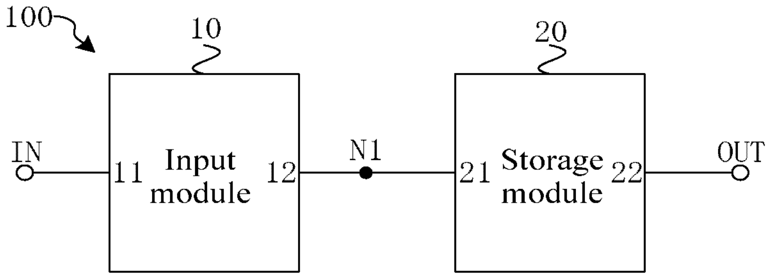
FIG. 2 is a structural diagram of a gate driving circuit according to an embodiment of the present invention.

To solve the preceding problem, an embodiment of the present invention provides a gate driving circuit. FIG. 2 is a structural diagram of a gate driving circuit according to an embodiment of the present invention. Referring to FIG. 2, the gate driving circuit 100 includes an input module 10 and a storage module 20. The input module 10 is connected to a first node N1 and a signal input terminal IN of the gate driving circuit 100. For example, an input terminal 11 of the input module 10 is connected to the signal input terminal IN and connected to an input signal of the gate driving circuit 100. An output terminal 12 of the input module 10 is connected to the first node N1. The input module 10 is configured to control the potential of the first node according to the potential of the signal input terminal IN. An input terminal 21 of the storage module 20 is connected to the first node N1. The storage module 20 is configured to store the potential of the first node N1 and control the potential of an output terminal 22 of the storage module 20 according to the potential of the first node N1. An output terminal 22 of the storage module 20, for example, is connected to a signal output terminal OUT of the gate driving circuit 100.

Exemplarily, the input module 10 may be composed of transistors or other controllable switch elements. The input module 10 may control the communication state between the input terminal 11 and the output terminal 12. When the input module 10 is turned on, the input terminal 11 communicates with the output terminal 12, and the input signal may be transmitted to the first node N1. When the input module 10 is turned off, the input terminal 11 is disconnected from the output terminal 12, and the input signal cannot be transmitted to the first node N1. The adjustment of the on-off time of the input module 10 may implement the adjustment of the corresponding relationship between the input signal and the potential of the first node N1. Exemplarily, the on-off state switching occasion of the input module 10 is controlled to be later than the occasion of the potential hopping of the input signal so that a potential hop (or pulse) of the input signal is transmitted to the first node N1 in a delayed manner.

Exemplarily, the storage module may be composed of two cross-coupled inverters. When the input module 10 is turned on, it is equivalent to supplying write information to the input terminal 22 of the storage module 20 so that the storage module 20 adjusts the potential of the output terminal 22 according to the potential of the first node N1, for example, inverts the potential of the first node N1 and outputs the inverted potential of the first node N1 to the output terminal 22 of the storage module 20. When the input module 10 is turned off, the storage module 20 is in the latch state so that the output terminal 22 can maintain the potential before the input module 10 is turned off until the input module 10 is turned on again. As long as the storage module 20 keeps powering on, data stored in the storage module 100 can be constantly maintained. During the driving process of the gate driving circuit 100, especially in a retention frame, the data at the input terminal 21 of the storage module 20 does not need to be refreshed periodically. The working state of the input module 10 and the working state of the storage module 20 do not need to be adjusted frequently, thus effectively reducing power consumption.

The input module 10 and the storage module 20 are disposed in the gate driving circuit 100 provided in this embodiment of the present invention. The input module 10 may be controlled to be turned on to adjust the potential of the first node N1 based on the potential of the signal input terminal IN. The write information is supplied to the input terminal 21 of the storage module 20 so that the storage module 20 adjusts the potential of the output terminal 22 according to the potential of the first node N1. The input module 10 may be controlled to be turned off to disconnect the signal input terminal IN from the first node N1 so that the storage module 20 is in the latch state, thereby implementing the potential maintaining of the output terminal 22 of the storage module 20. The structure of the gate driving circuit 100 is simple and easy to implement, helping reduce the power consumption of the circuit. Moreover, the gate driving circuit 100 uses the storage module 20 to store signals. The storage module 20 has the function of constantly maintaining the stored in the state of powering on. Therefore, the working state of the input module 10 and the working state of the storage module 20 in the retention frame do not need to be adjusted periodically as those in a refresh frame, thus effectively reducing the static power consumption of the circuit.

Figure 3:
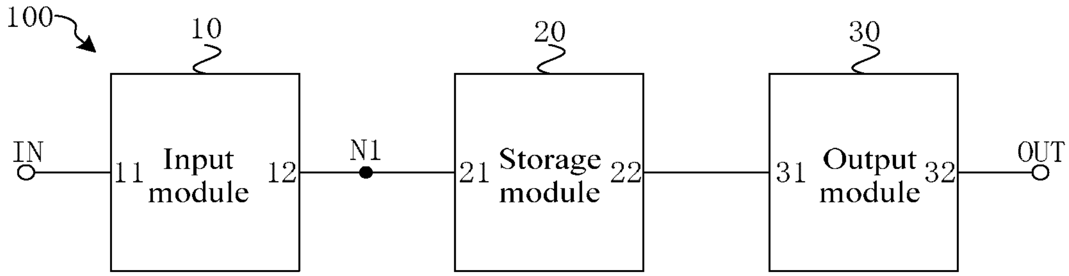
FIG. 3 is a structural diagram of another gate driving circuit according to an embodiment of the present invention.

FIG. 3 is a structural diagram of another gate driving circuit according to an embodiment of the present invention. Referring to FIG. 3, based on each preceding embodiment, optionally, the gate driving circuit 100 further includes an output module 30 connected between the output terminal 22 of the storage module 20 and a signal output terminal OUT and configured to control the potential of the signal output terminal OUT according to the potential of the output terminal 22 of the storage module 20. For example, the output module 30 may invert the potential of the output terminal 22 of the storage module 20. In this embodiment, the arrangement of the output module 30 enables the potential of the output terminal 22 of the storage module 20 to be further processed (for example, inverted) and then output, improving the application flexibility of the gate driving circuit 100. It is to be noted that it may be determined according to requirements whether the output module 30 is provided in actual use. In other words, in actual use, it may be selected according to requirements whether an output signal of the output terminal 22 of the storage module 20 or an output signal of an output terminal 32 of the output module 30 is transmitted to a gate of a corresponding transistor in the pixel circuit.

In the preceding embodiments, functions of various modules in the gate driving circuit 100 are exemplified. Specific structures that the gate driving circuit 100 may have are described hereinafter.

Figure 4:
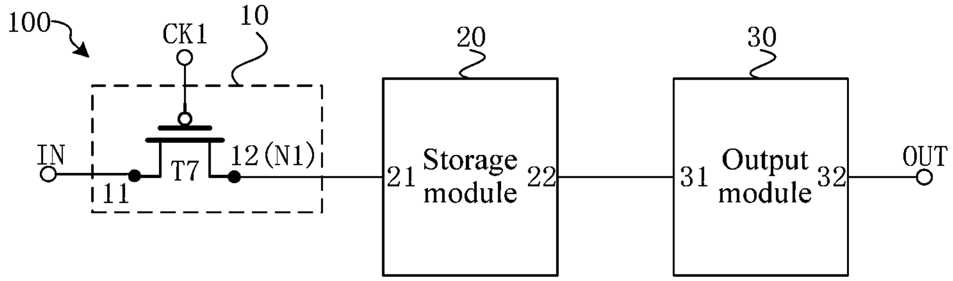
FIG. 4 is a structural diagram of another gate driving circuit according to an embodiment of the present invention.

FIG. 4 is a structural diagram of another gate driving circuit according to an embodiment of the present invention.

Referring to FIG. 4, based on the preceding embodiments, optionally, the input module 10 includes a seventh transistor T7. A first electrode of the seventh transistor T7 is connected to the signal input terminal IN. A second electrode of the seventh transistor T7 is connected to the first node N1. A gate of the seventh transistor T7 is connected to a first clock terminal CK1 of the gate driving circuit 100. The seventh transistor T7 is turned on or off in the control of the first clock terminal CK1 to control the on-off state of the input module 10. In this embodiment, the input module 10 includes one transistor so that the structure of the input module 10 is simple and easy to implement, helping simplify the structure of the gate driving circuit 100 and implement a narrow bezel.

Figure 5:
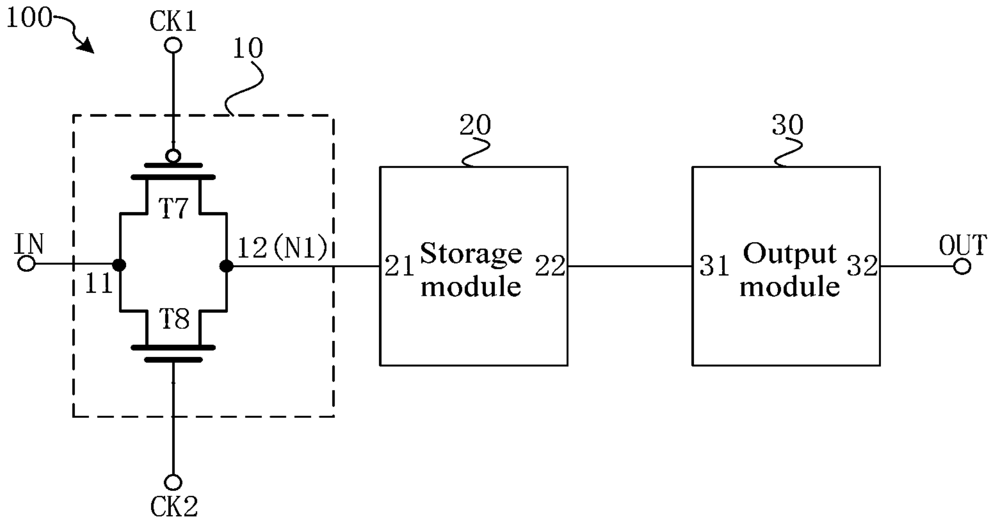
FIG. 5 is a structural diagram of another gate driving circuit according to an embodiment of the present invention.

FIG. 5 is a structural diagram of another gate driving circuit according to an embodiment of the present invention. Referring to FIG. 5, based on the preceding embodiments, optionally, the input module 10 includes an eighth transistor T8. A first electrode of the eighth transistor T8 is connected to the signal input terminal IN. A second electrode of the eighth transistor T8 is connected to the first node N1. A gate of the eighth transistor T8 is connected to a second clock terminal CK2 of the gate driving circuit 100. A signal connected to the first clock terminal CK1 and a signal connected to the second clock terminal CK2 are mutually inverse signals. The channel type of the seventh transistor T7 is opposite to the channel type of the eighth transistor T8. The seventh transistor T7 and the eighth transistor T8 are connected in parallel to form a transmission gate. Exemplarily, the seventh transistor T7 is a p-type transistor, and the eighth transistor T8 is an n-type transistor.

In this embodiment, the input module 10 is configured as the transmission gate structure, effectively improving the reliability of the gate driving circuit 100. Specifically, a p-type transistor has a threshold voltage loss when the low potential is transmitted so that a high potential can pass without loss and a low potential passes with loss. On the contrary, an n-type transistor has a threshold voltage loss when a high potential is transmitted so that only a low potential can pass without loss. The transmission gate is composed of two transistors with opposite channel types, and gates of the two transistors are connected to two mutually inverse signals respectively, guaranteeing that the on-off states of the two transistors are consistent. In this case, when the input module 10 is turned on, the seventh transistor T7 and the eighth transistor T8 are turned on simultaneously so that a low potential and a high potential can pass without loss, effectively guaranteeing the potential transmission capability of the input module 10 and extending the range of potentials that the input module 10 can transmit. Therefore, such an arrangement guarantees that when the input module 10 is turned on, the potential of the first node N1 is consistent with the potential of the input signal, avoiding an output anomaly caused by a threshold voltage loss.

Figure 6:
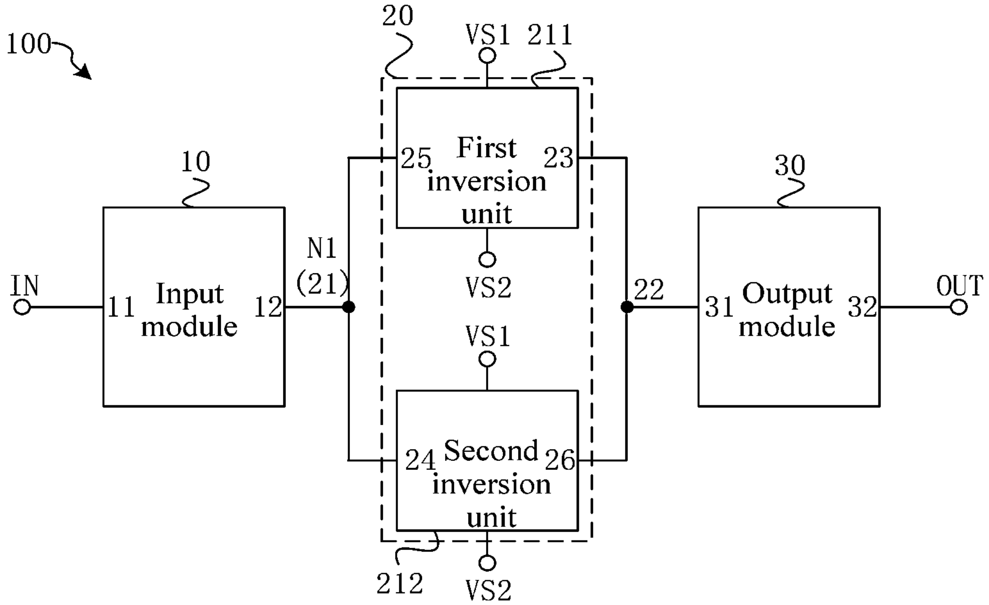
FIG. 6 is a structural diagram of another gate driving circuit according to an embodiment of the present invention.

FIG. 6 is a structural diagram of another gate driving circuit according to an embodiment of the present invention. Referring to FIG. 6, based on the preceding embodiments, optionally, the storage module 20 includes a first inversion unit 211 and a second inversion unit 212. A control terminal 25 of the first inversion unit 211 is connected to the first node N1. A first input terminal of the first inversion unit 211 is connected to a first power terminal VS1 of the gate driving circuit 100. A second input terminal of the first inversion unit 211 is connected to a second power terminal VS2 of the gate driving circuit 100. An output terminal 23 of the first inversion unit 211 is connected to the output terminal 22 of the storage module 20. A control terminal 26 of the second inversion unit 212 is connected to the output terminal 22 of the storage module 20. A first input terminal of the second inversion unit 212 is connected to the first power terminal VS1. A second input terminal of the second inversion unit 212 is connected to the second power terminal VS2. An output terminal 24 of the second inversion unit 212 is connected to the first node N1. The potential connected to the first power terminal VS1 is different from the potential connected to the second power terminal VS2. For example, the first power terminal VS1 is connected to a first power signal and has a high potential, and the second power terminal VS2 is connected to a second power signal and has a low potential. In this embodiment, the storage module 20 is composed of two inversion units. The input and output of the two inversion units are cross-connected, implementing the locking and saving of the output states of the two inversion units.

Figure 7:
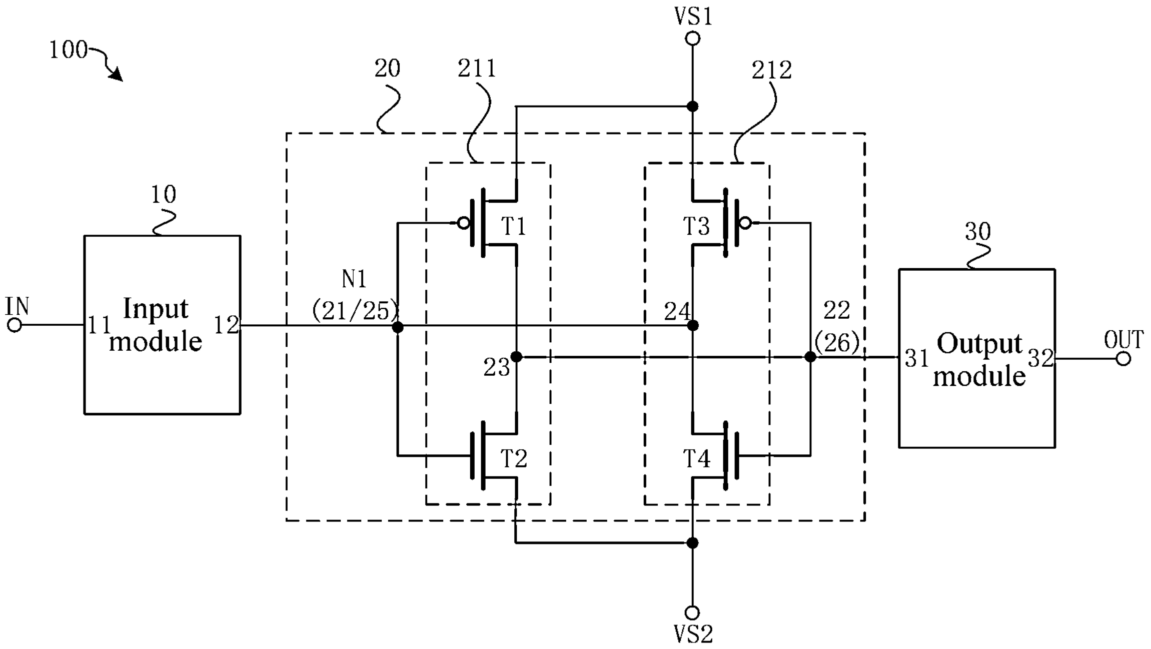
FIG. 7 is a structural diagram of another gate driving circuit according to an embodiment of the present invention.

FIG. 7 is a structural diagram of another gate driving circuit according to an embodiment of the present invention. Referring to FIG. 7, specifically, the first inversion unit 211 includes a first transistor T1 and a second transistor T2. A gate of the first transistor T1 and a gate of the second transistor T2 are each connected to the first node N1. A first electrode of the first transistor T1 is connected to the first power terminal VS1. A first electrode of the second transistor T2 is connected to the second power terminal VS2. A second electrode of the first transistor T1 and a second electrode of the second transistor T2 are each connected to the output terminal 23 of the first inversion unit 211. The second inversion unit 212 includes a third transistor T3 and a fourth transistor T4. A gate of the third transistor T3 and a gate of the fourth transistor T4 are each connected to the output terminal 22 of the storage module 20. A first electrode of the third transistor T3 is connected to the first power terminal VS1. A first electrode of the fourth transistor T4 is connected to the second power terminal VS2. A second electrode of the third transistor T3 and a second electrode of the fourth transistor T4 are each connected to the output terminal 24 of the second inversion unit 212.

The channel type of the first transistor T1 is opposite to the channel type of the second transistor T2. The channel type of the third transistor T3 is opposite to the channel type of the fourth transistor T4. The channel type of the first transistor T1 is the same as the channel type of the third transistor T3. In FIG. 3, exemplarily, the first transistor T1 and the third transistor T3 are each a p-type transistor, and the second transistor T2 and the fourth transistor T4 are each an n-type transistor.

The structure in FIG. 7 is taken for example, when the input module 10 is turned on and transmits a potential to the first node N1, by way of example, the first node N1 has a low potential. The potential of the first node N1 controls the first transistor T1 to be turned on and controls the second transistor T2 to be turned off. The high potential of the first power terminal VS1 is transmitted to the output terminal 23 of the first inversion unit 211 and thereby transmitted to the output terminal 22 of the storage module 20 so that the output terminal 22 of the storage module 20 is stable at the high potential. Moreover, the potential of the output terminal 22 of the storage module 20 controls the third transistor T3 to be turned off and controls the fourth transistor T4 to be turned on. The low potential of the second power terminal VS2 is transmitted to the output terminal 24 of the second inversion unit 212 and thereby transmitted to the input terminal 21 of the storage module 20 so that the input terminal 21 of the storage module 20 is stable at the low potential. Then the input module 10 is turned off. Four transistors in the storage module 20 are each in the stable state. The storage module 20 enters the latch state and latches the low potential of the first node N1. In this case, in the case where each of the two power terminals does not power off, the latch content is maintained constantly. The output terminal 22 of the storage module 20 outputs high potentials continuously. When the input module 10 is turned on again, if the first node N1 still receives a low potential, the output potential of the storage module 20 is unchanged; if the first node N1 receives a high potential, the on-off state of each transistor in the storage module 20 is reversed, and the storage module 20 turns to output a low potential.

In this embodiment, the storage module 20 is composed of four transistors so that the storage module 20 has a simple structure, requires a small number of elements, and occupies a small layout space, helping reduce circuit cost and implement a narrow bezel.

Figure 8:
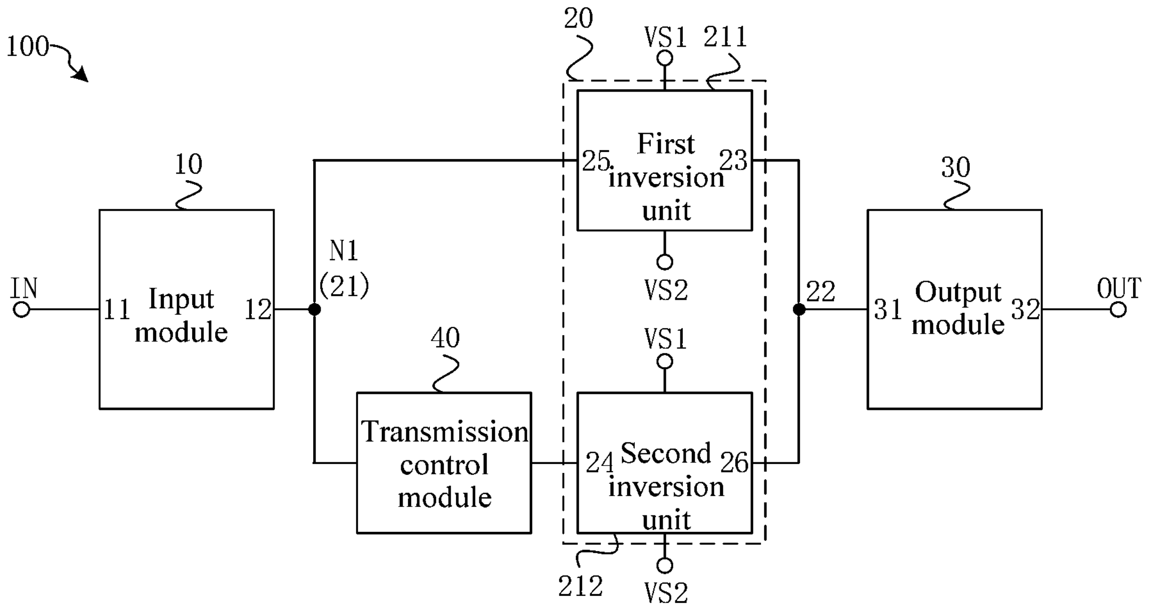
FIG. 8 is a structural diagram of another gate driving circuit according to an embodiment of the present invention.

FIG. 8 is a structural diagram of another gate driving circuit according to an embodiment of the present invention. Referring to FIG. 8, based on the preceding embodiments, optionally, the gate driving circuit 100 further includes a transmission control module 40 connected between the first node N1 and the output terminal 24 of the second inversion unit and configured to control whether the first node N1 communicates with the output terminal 24 of the second inversion unit. The transmission control module 40 may be controlled to be turned off when the input module 10 is turned on to cut the interlocking between the first inversion unit 211 and the second inversion unit 212 to reduce the difficulty of the output state switching of the storage module 20, reducing the requirements for the driving capability of the first transistor T1 and the driving capability of the second transistor T2. Moreover, the transmission control module 40 may be controlled to be turned on when the input module 10 is turned off so that the storage module 20 may be connected as a standard structure of two cross-coupled inverters when the input module is turned off, implementing the function of state locking.

Figure 9:
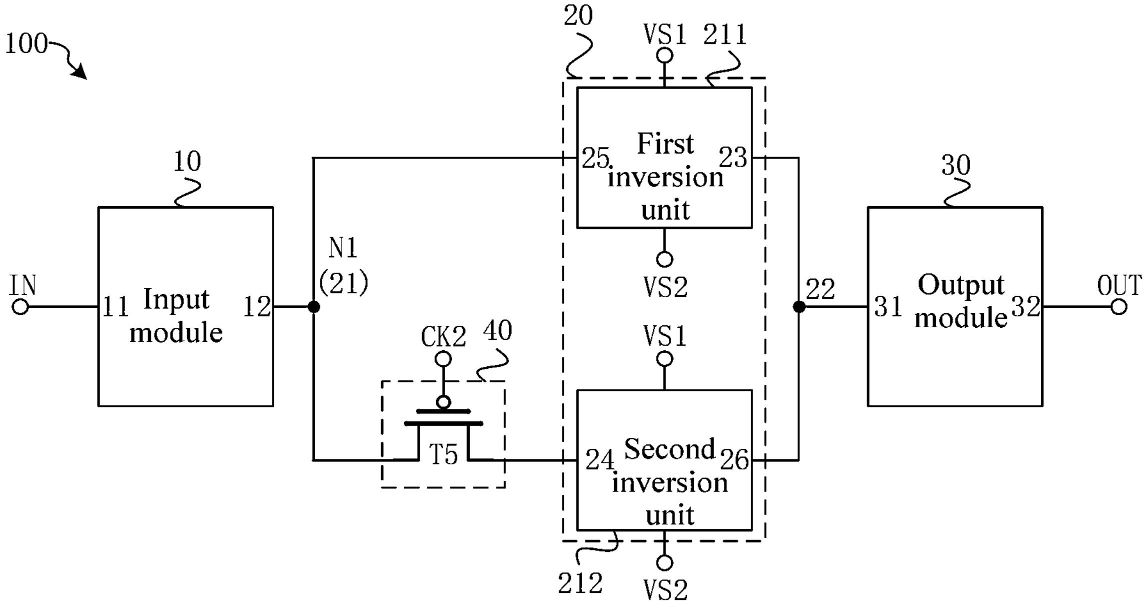
FIG. 9 is a structural diagram of another gate driving circuit according to an embodiment of the present invention.

FIG. 9 is a structural diagram of another gate driving circuit according to an embodiment of the present invention. Referring to FIG. 9, specifically, the transmission control module 40 may include a fifth transistor T5. A first electrode of the fifth transistor T5 is connected to the first node N1. A second electrode of the fifth transistor T5 is connected to the output terminal 24 of the second inversion unit. A gate of the fifth transistor T5 is connected to the second clock terminal CK2 so that the on-off state of the fifth transistor T5 is opposite to the on-off state of the input module 10. In this embodiment, the transmission control module 40 is configured to include one transistor so that the structure of the transmission control module 40 is simple and easy to implement.

Figure 10:
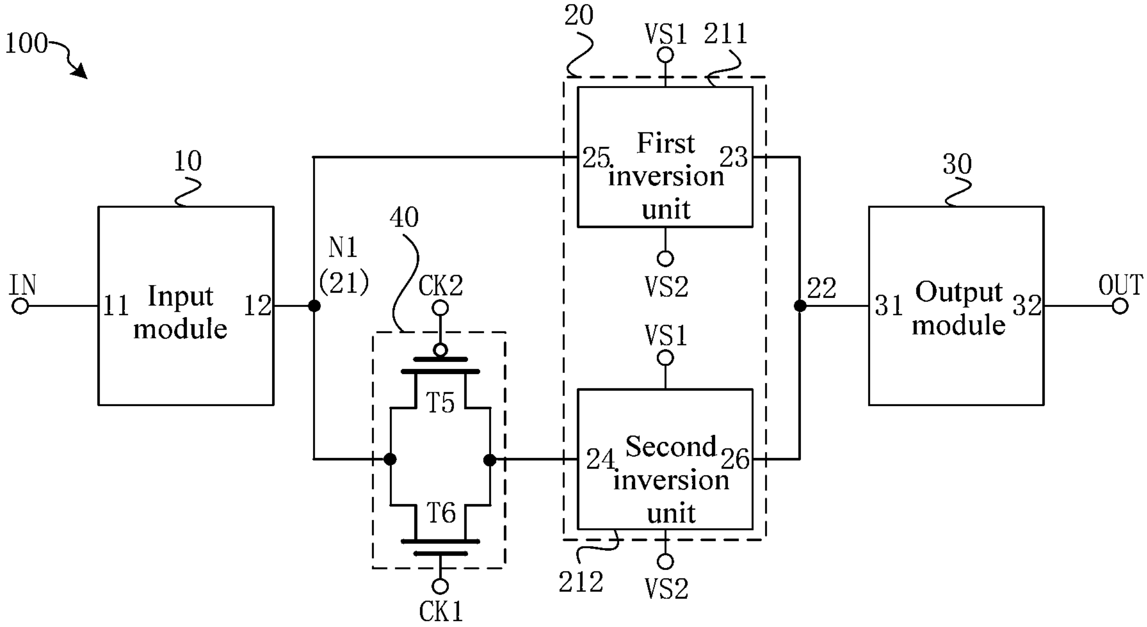
FIG. 10 is a structural diagram of another gate driving circuit according to an embodiment of the present invention.

FIG. 10 is a structural diagram of another gate driving circuit according to an embodiment of the present invention. Referring to FIG. 10, based on the preceding embodiments, optionally, the transmission control module 40 further includes a sixth transistor T6. A first electrode of the sixth transistor T6 is connected to the first node N1. A second electrode of the sixth transistor T6 is connected to the output terminal 24 of the second inversion unit. A gate of the sixth transistor T6 is connected to the first clock terminal CK1. The channel type of the fifth transistor T5 is opposite to the channel type of the sixth transistor T6. The fifth transistor T5 and the sixth transistor T6 are connected in parallel to form a transmission gate so that when the transmission gate is turned on, the potential of the first node N1 can be transmitted to the output terminal 24 of the second inversion unit without loss. In FIG. 3, exemplarily, the fifth transistor T5 is a p-type transistor, and the sixth transistor T6 is an n-type transistor.

Figure 11:
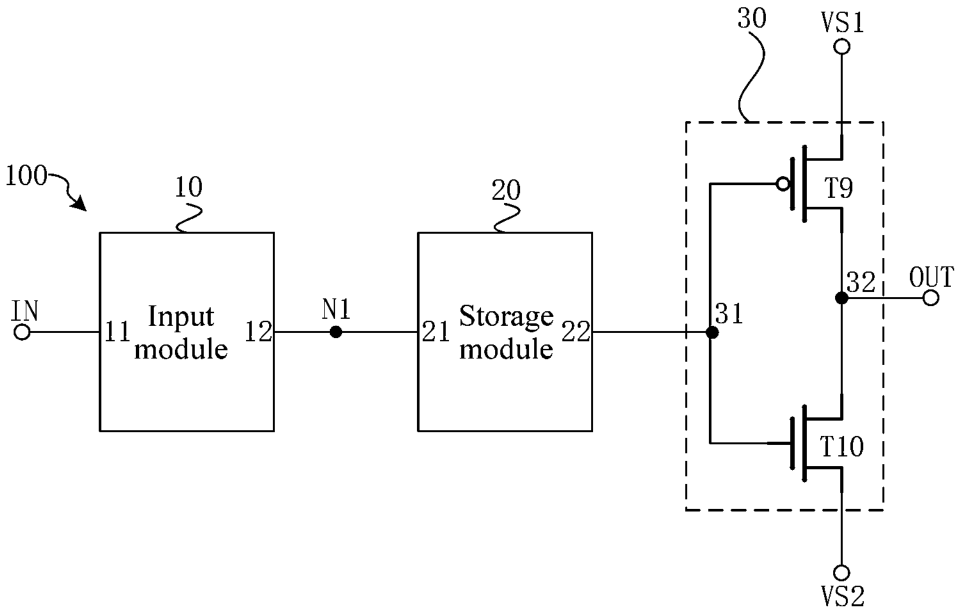
FIG. 11 is a structural diagram of another gate driving circuit according to an embodiment of the present invention.

FIG. 11 is a structural diagram of another gate driving circuit according to an embodiment of the present invention. Referring to FIG. 11, based on the preceding embodiments, optionally, the output module 30 includes a ninth transistor T9 and a tenth transistor T10. A gate of the ninth transistor T9 and a gate of the tenth transistor T10 are each connected to the output terminal 22 of the storage module 20. A first electrode of the ninth transistor T9 is connected to the first power terminal VS1. A first electrode of the tenth transistor T10 is connected to the second power terminal VS2. A second electrode of the ninth transistor T9 and a second electrode of the tenth transistor T10 are each connected to the signal output terminal OUT. The channel type of the ninth transistor T9 is opposite to the channel type of the tenth transistor T10. The ninth transistor T9 and the tenth transistor T10 constitute an inverter to implement the inversion of a signal of the output terminal 22 of the storage module 20. In the figure, exemplarily, the ninth transistor T9 is a p-type transistor, and the tenth transistor T10 is an n-type transistor.

Figure 12:
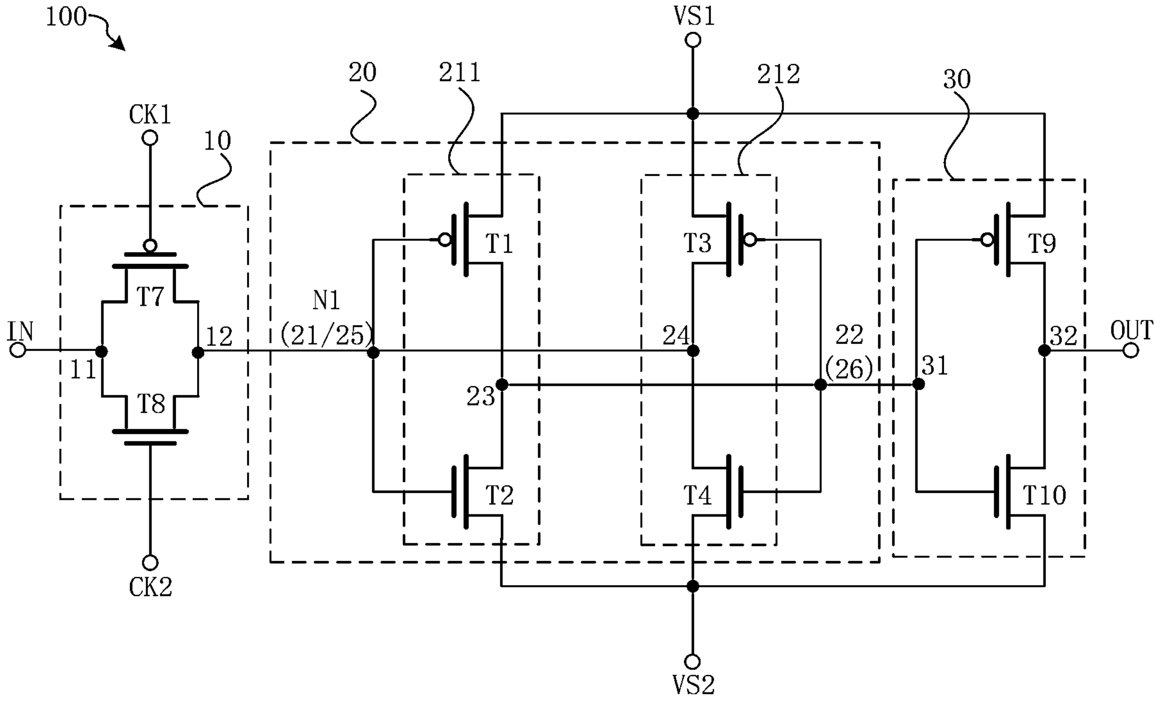
FIG. 12 is a structural diagram of another gate driving circuit according to an embodiment of the present invention.
Figure 13:
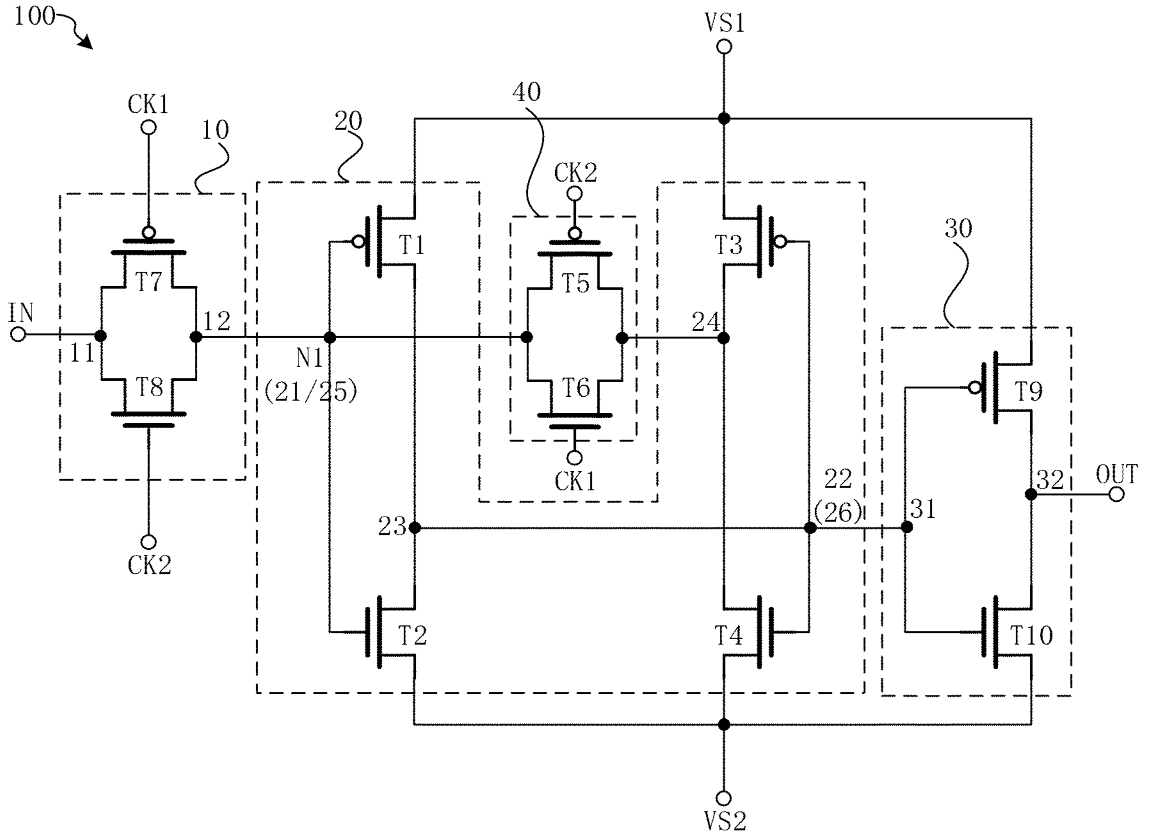
FIG. 13 is a structural diagram of another gate driving circuit according to an embodiment of the present invention.

FIG. 12 is a structural diagram of another gate driving circuit according to an embodiment of the present invention and exemplarily illustrates the specific structure of a gate driving circuit 100 composed of the input module 10, the storage module 20, and the output module 30. FIG. 13 is a structural diagram of another gate driving circuit according to an embodiment of the present invention and exemplarily illustrates the specific structure of a gate driving circuit 100 composed of the input module 10, the storage module 20, the output module 30, and the transmission control module 40.

Figure 14:
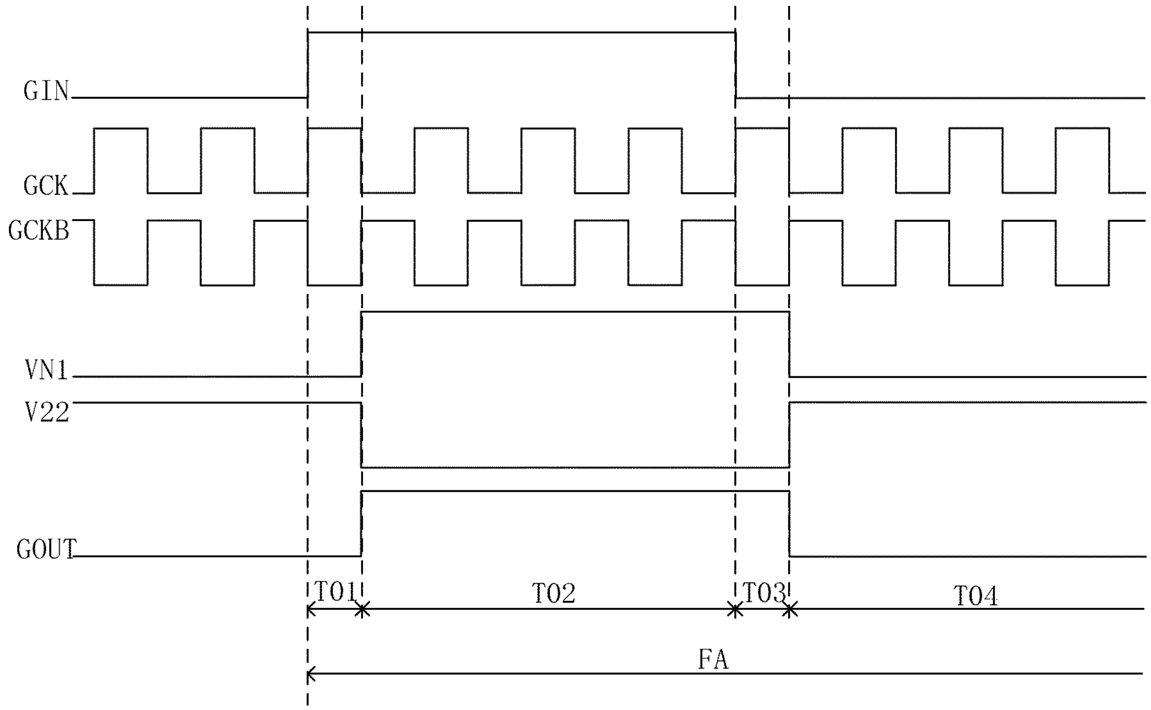
FIG. 14 is a drive timing diagram of a gate driving circuit according to an embodiment of the present invention.

FIG. 14 is a drive timing diagram of a gate driving circuit according to an embodiment of the present invention. Referring to FIG. 14 and the circuit structure in FIG. 13, an input signal connected to the signal input terminal IN is denoted as GIN. A first clock signal connected to the first clock terminal CK1 is denoted as GCK. A second clock signal connected to the second clock terminal CK2 is denoted as GCKB. A gate driving signal output by the signal output terminal OUT is denoted as GOUT. The specific driving process of the gate driving circuit 100 includes the following.

At a first stage T01, although the input signal GIN hops high, the first clock signal GCK hops high and the second clock signal GCKB hops low. The seventh transistor T7 and the eighth transistor T8 are each turned off. The high potential of the input signal GIN cannot be transmitted to the first node N1. The potential VN1 of the first node N1 is maintained at the low potential of the previous stage. In this case, the fifth transistor T5 and the sixth transistor T6 are each turned on. The first node N1 communicates with the output terminal 24 of the second inversion unit. The storage module 20 is connected as a standard structure of two cross-coupled inverters. The potential V22 of the output terminal 22 of the storage module 20 is a high potential. The tenth transistor T10 and the ninth transistor T9 are controlled to be turned on and off respectively so that the output module 30 inverts the potential V22 of the output terminal 22 of the storage module 20. The gate driving signal GOUT has a low potential.

At a second stage T02, at the beginning of this stage, the first clock signal GCK hops low, and the second clock signal GCKB hops high. The seventh transistor T7 and the eighth transistor T8 are each turned on. The high potential of the input signal GIN is transmitted to the first node N1 so that the potential VN1 of the first node N1 is set high. Inverted by the first inversion unit, the potential V22 of the output terminal 22 of the storage module 20 is set low. The ninth transistor T9 and the tenth transistor T10 are controlled to be turned on and off respectively so that the gate driving signal GOUT hops to a high potential. After the first clock signal GCK hops high (and the second clock signal GCKB hops low), although the seventh transistor T7 and the eighth transistor T8 are each turned off and the input signal GIN is no longer transmitted, the fifth transistor T5 and the sixth transistor T6 are each turned on. In this case, the first transistor T1, the second transistor T2, the third transistor T3, and the fourth transistor T4 constitute a structure of two cross-coupled inverters and are in the latch state so that the potential VN1 of the first node N1 and the potential V22 of the output terminal 22 of the storage module 20 are maintained. Therefore, the gate driving signal GOUT maintains the high potential at the second stage T02.

At a third stage T03, although the input signal GIN hops low, the first clock signal GCK hops high and the second clock signal GCKB hops low. The seventh transistor T7 and the eighth transistor T8 are each turned off. The low potential of the input signal GIN cannot be transmitted to the first node N1. The potential VN1 of the first node N1 is maintained at the high potential of the previous stage. Correspondingly, the potential V22 of the output terminal 22 of the storage module 20 is maintained at the historical state of the previous stage and is a low potential. Therefore, the gate driving signal GOUT still has the high potential.

At a fourth stage T04, at the beginning of this stage, the first clock signal GCK hops low, and the second clock signal GCKB hops high. The seventh transistor T7 and the eighth transistor T8 are each turned on. The low potential of the input signal GIN is transmitted to the first node N1 so that the potential VN1 of the first node N1 is set high. Inverted by the first inversion unit, the potential V22 of the output terminal 22 of the storage module 20 is set high. Inverted by the output module 30, the gate driving signal GOUT hops to a low potential. After the first clock signal GCK hops high, although the seventh transistor T7 and the eighth transistor T8 are each turned off and the input signal GIN is no longer transmitted, the fifth transistor T5 and the sixth transistor T6 are each turned on. In this case, the first transistor T1, the second transistor T2, the third transistor T3, and the fourth transistor T4 constitute a structure of two cross-coupled inverters and are in the latch state so that the potential VN1 of the first node N1 and the potential V22 of the output terminal 22 of the storage module 20 are maintained. Therefore, the gate driving signal GOUT maintains the low potential at the fourth stage T04.

The driving process of the gate driving circuit 100 may be repeated in a cycle from the first stage T01 to the fourth stage T04. For example, a stage before the first stage T01 in FIG. 14 may be considered as a fourth stage T04 in the previous cycle.

This embodiment exemplifies the driving process of the gate driving circuit 100. The gate driving circuit 100 can effectively eliminate the step phenomenon during the potential hopping process of the gate driving signal GOUT. Specifically, it can be seen from FIG. 1 that in the related art, a light emission control circuit needs to depend on the bootstrap action of a capacitor to fully output a low level due to the voltage loss of a p-type transistor when transmitting a low potential, resulting in the existence of a falling-edge step of an output signal of the light emission control circuit. According to the preceding analysis, the complementary TFT circuit architecture is adopted in this embodiment to transmit the potential of the signal input terminal IN to the first node N1 without loss and transmit the potential of the first node N1 to the output terminal 22 of the second inversion unit without loss. The potential of the first node N1 is output after the inversion by the storage module 20 and the re-inversion by the output module 30. No threshold voltage loss exists during the low potential transmission or the high potential transmission during the driving process, and the bootstrap action of a capacitor is not required, effectively eliminating the falling-edge step and simplifying the circuit structure.

Figure 15:
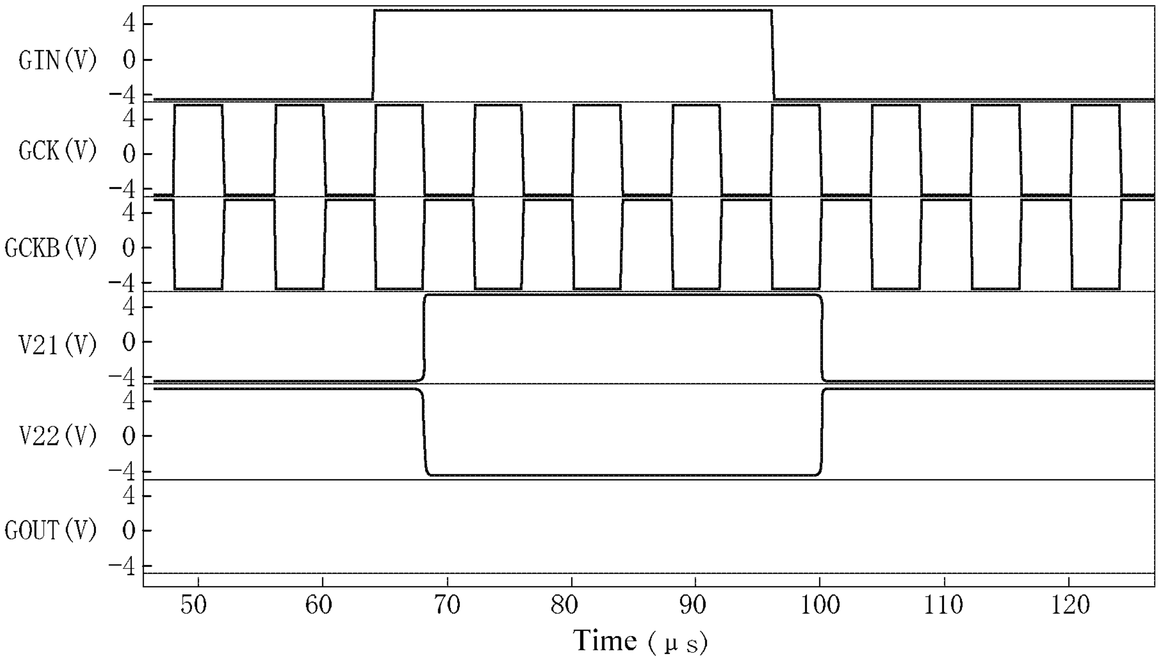
FIG. 15 is a signal waveform diagram of a gate driving circuit during a driving process according to an embodiment of the present invention.

To verify the reliability of the gate driving circuit 100, an inventor carried out a test according to the circuit structure shown in FIG. 13. For the test waveform, refer to FIG. 15. According to FIG. 15, the gate driving circuit 100 can effectively implement the shift output of the input signal GIN and basically implement signal transmission without loss. Moreover, no falling-edge step exists in the gate driving signal GOUT.

Based on the preceding embodiments, optionally, a functional transistor in a pixel circuit which the gate driving circuit 100 specifically acts on may be set according to actual requirements. For example, the gate driving circuit 100 shown in FIG. 12 or 13 may act on a p-type light emission control transistor, and the high-potential pulse of the gate driving signal GOUT is configured to control the light emission control transistor to be turned off. Alternatively, the gate driving circuit 100 shown in FIG. 12 or 13 may act on an n-type gate reset transistor or an n-type threshold compensation transistor, and the high-potential pulse of the gate driving signal GOUT is configured to control the n-type transistor to be turned on.

Based on the preceding embodiments, optionally, the period and low-potential width of each clock signal may be set according to actual requirements. Exemplarily, the period of a clock signal may be set to two pieces of row time. A low-potential width is one piece of row time. The high-potential duty cycle is 50%. Alternatively, if the output terminal 22 of the storage module 22 needs to be used for supplying a gate control signal to a p-type data write transistor, the low-potential pulse width of the output terminal 22 of the storage module 22 needs to be within one piece of row time. Correspondingly, the period of a clock signal may be set to be less than or equal to one piece of row time.

It is to be noted that the driving process from the first stage T01 to the fourth stage T04 in FIG. 14 may be considered as the driving process of the gate driving circuit 100 in a refresh frame FA. In the refresh frame FA, the gate driving signal GOUT is a pulse signal. Multi-level gate driving circuits 100 can implement the shift output of a first-level input signal by level. Therefore, in the refresh frame FA, the first clock signal GCK and the second clock signal GCKB are each a periodically changing pulse signal.

In a low-frequency display scenario, at least one retention frame is inserted between two adjacent refresh frames. In a retention frame, the gate driving signal GOUT can maintain an off potential of a controlled transistor. The gate driving signal GOUT is presented as a direct current signal without potential hopping in the retention frame.

Figure 16:
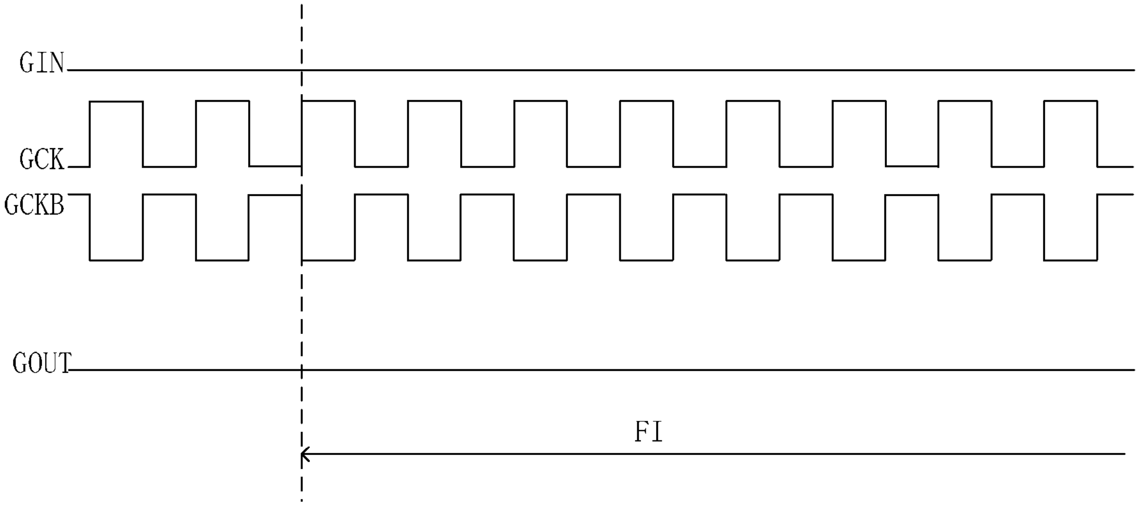
FIG. 16 is a drive timing diagram of a gate driving circuit in a retention frame according to an embodiment of the present invention.

FIG. 16 is a drive timing diagram of a gate driving circuit in a retention frame according to an embodiment of the present invention. Referring to FIG. 16, in an embodiment, optionally, in the retention frame, the first clock signal GCK and the second clock signal GCKB are still each a periodically changing pulse signal. Since the input signal GIN has no high-potential pulse in the retention frame, the gate driving circuit 100 is equivalent to maintaining the state at the fourth stage T04. Correspondingly, the gate driving signal GOUT has no high-potential pulse.

Figure 17:
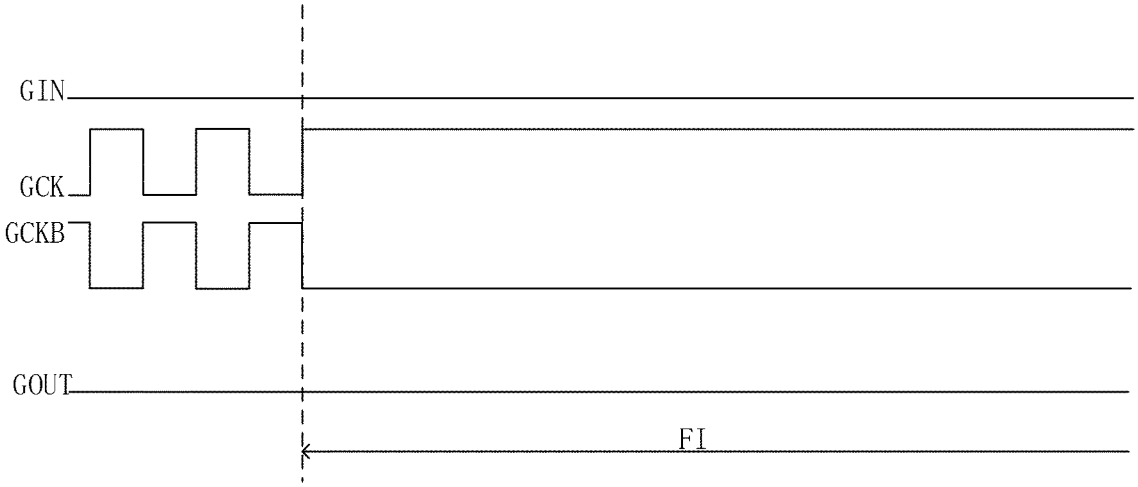
FIG. 17 is a drive timing diagram of another gate driving circuit in a retention frame according to an embodiment of the present invention.
Figure 18:
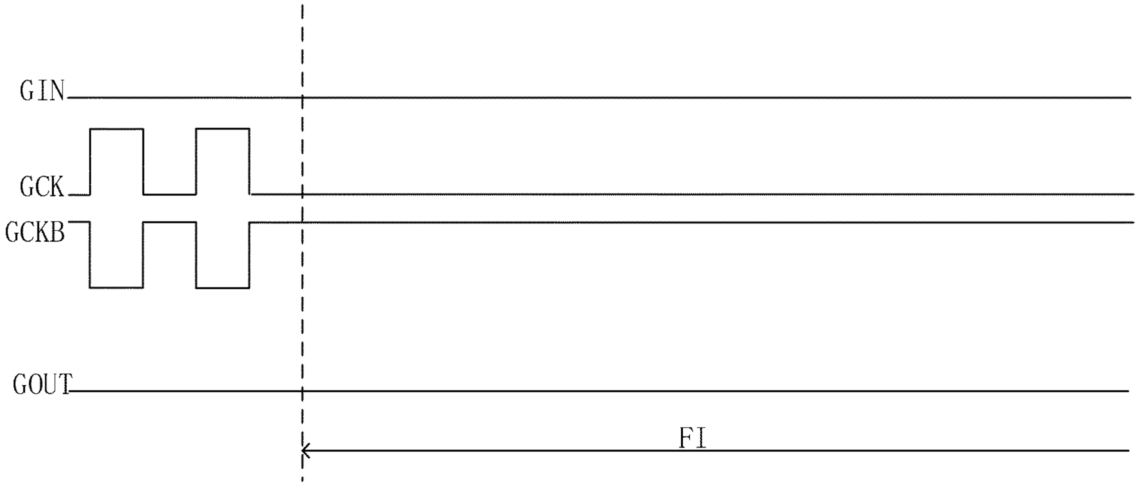
FIG. 18 is a drive timing diagram of another gate driving circuit in a retention frame according to an embodiment of the present invention.

Alternatively, in another embodiment, optionally, in the retention frame, the first clock signal GCK and the second clock signal GCKB are each presented as a direct current signal without potential hopping to reduce circuit power consumption. Specifically, the circuit structure in FIG. 13 is still taken for example. Referring to FIG. 17, in the retention frame FI, the first clock signal GCK may be set to maintain a high potential, and the second clock signal GCKB may be set to maintain a low potential. In this case, the input module 10 is turned off, and the transmission control module 40 is turned on. The storage module 20 is used for storing potential information so that the gate driving signal GOUT maintains a low potential. Alternatively, referring to FIG. 18, in the retention frame FI, the first clock signal GCK may be set to maintain a low potential, and the second clock signal GCKB may be set to maintain a high potential. In this case, the input module 10 is turned on, and the transmission control module 40 is turned off. In this case, the input signal GIN is controlled to maintain a low potential that may be transmitted to the first node N1, inverted by the first inversion unit 211, and re-inverted by the output module 30. The gate driving signal GOUT may also maintain a low potential.

Figure 19:
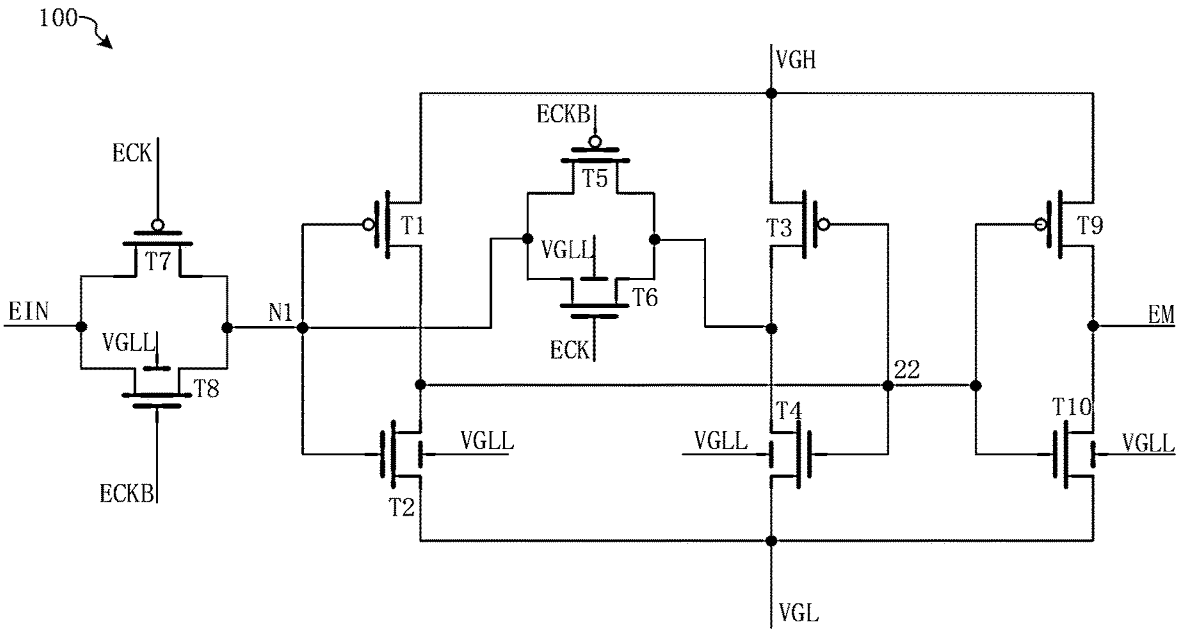
FIG. 19 is a structural diagram of another gate driving circuit according to an embodiment of the present invention.

FIG. 19 is a structural diagram of another gate driving circuit according to an embodiment of the present invention. Referring to FIG. 19, based on the preceding embodiments, optionally, for each n-type transistor in the gate driving circuit 100, an n-type transistor may be provided with a four-terminal structure including a second gate. Agate mentioned in the preceding embodiments, for example, may be a top gate of the n-type transistor. The second gate, for example, may be a bottom gate of the n-type transistor. The second gate of the n-type transistor may be connected to a third power terminal of the gate driving circuit 100 and connected to a third power signal VGLL to suppress the threshold voltage shift and fluctuation of the n-type transistor. The off-state leakage current of the n-type transistor is suppressed by regulating the threshold voltage of the n-type transistor. Exemplarily, the n-type transistor may be an indium gallium zinc oxide (IGZO) transistor. The threshold voltage may be negative in the working process. Correspondingly, the potential of the third power signal VGLL may be set to be lower than or equal to the potential of the second power signal VGL. Exemplarily, the value range of the third power signal VGLL is [VGL−4, VGL]. For an LTPS n-type transistor, no second gate may be provided.

It is to be noted that in the preceding embodiments, the first electrode of each transistor may be referred to as a source or a drain, and the second electrode of each transistor may be referred to as a drain or a source. Since the structure of each transistor is symmetrical, the source and the drain here are not differentiated from each other.

Above all, embodiments of the present invention provide a gate driving circuit based on a complementary thin-film transistor, eliminating the threshold voltage loss caused by low-level transmission and thus eliminating a falling-edge step. Moreover, the circuit requires a small number of elements, narrowing the bezel of the display panel. Besides, embodiments of the present invention use the storage module to store signals. In a low refresh condition, a clock signal does not need to hop continuously, having an obvious advantage in saving low-frequency power consumption.

Figure 20:
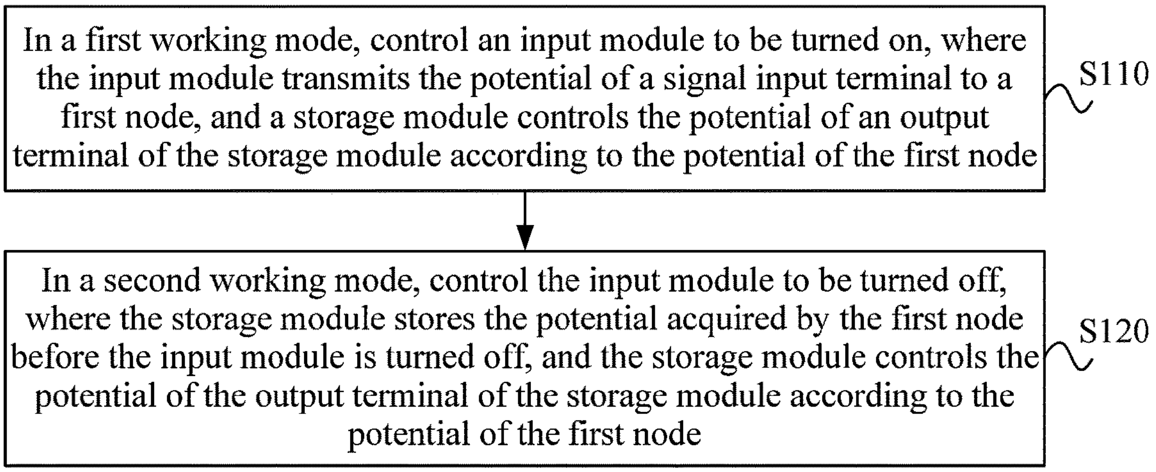
FIG. 20 is a flowchart of a driving method of a gate driving circuit according to an embodiment of the present invention.

An embodiment of the present invention further provides a driving method of a gate driving circuit for driving the gate driving circuit provided in any embodiment of the present invention. The method has corresponding beneficial effects. FIG. 20 is a flowchart of a driving method of a gate driving circuit according to an embodiment of the present invention. Referring to FIG. 20, the driving method includes S110 and S120.

In S110, in a first working mode, an input module is controlled to be turned on. The input module transmits the potential of a signal input terminal to a first node. A storage module controls the potential of an output terminal of the storage module according to the potential of the first node.

In S120, in a second working mode, the input module is controlled to be turned off. The storage module stores the potential acquired by the first node before the input module is turned off. Moreover, the storage module controls the potential of the output terminal of the storage module according to the potential of the first node.

In the driving process of the gate driving circuit, the gate driving circuit may be controlled to execute the first working mode and the second working mode alternately according to actual requirements. Based on the first working mode, an input signal connected to the signal input terminal may be transmitted to the storage module so that the output of the storage module is synchronously controlled by the input signal. Based on the second working mode, the transmission of the input signal to the storage module may be disconnected so that the storage module maintains the output state before the input module is turned off. Exemplarily, the switching timing of the first working mode and the second working mode is adjusted to adjust the on-off time of the input module, thereby adjusting the correspondence relationship between the input signal and the potential of the first node and thus controlling whether the output signal of the storage module changes synchronously with the input signal. Exemplarily, the switching occasion of switching from the second working mode to the first working mode is controlled to be later than the occasion of the potential hopping of the input signal so that a potential hop (or pulse) of the input signal is transmitted to the first node N1 in a delayed manner, thereby implementing the shift output of the input signal.

Figure 21:
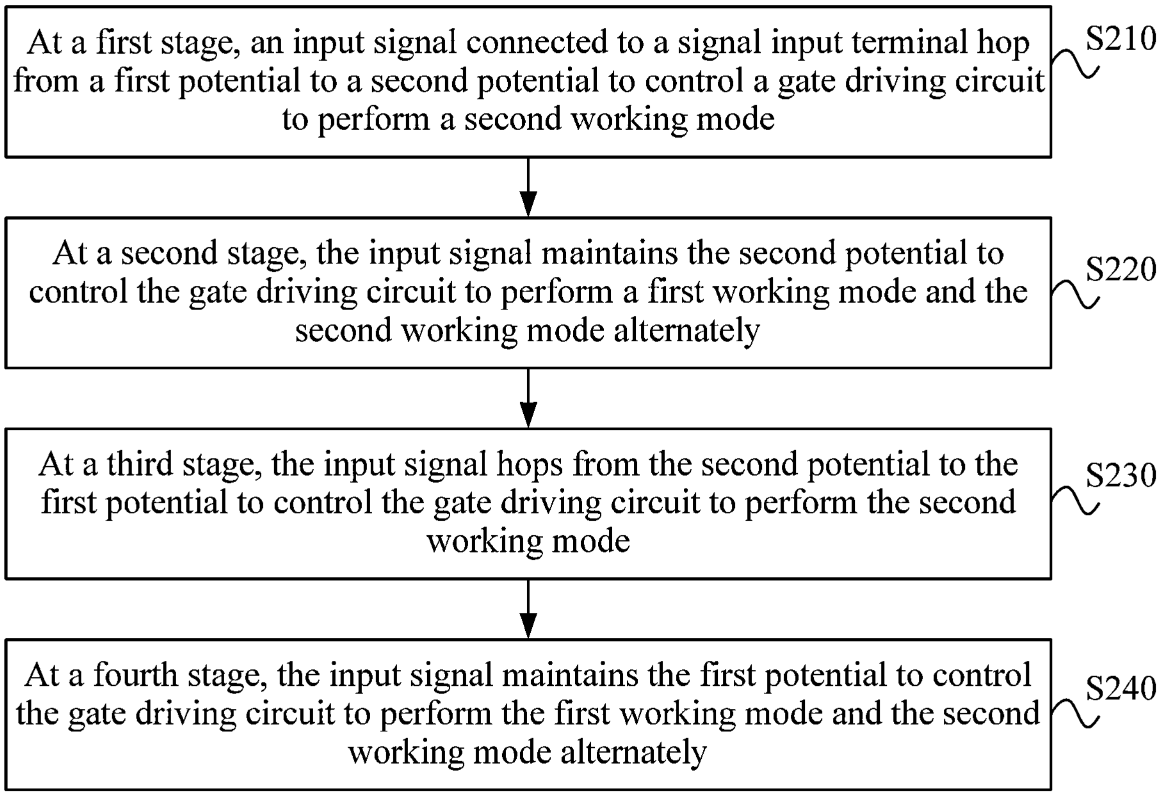
FIG. 21 is a flowchart of another driving method of a gate driving circuit according to an embodiment of the present invention.

FIG. 21 is a flowchart of another driving method of a gate driving circuit according to an embodiment of the present invention. Referring to FIG. 21, the driving method may specifically include S210, S220, S230, and S240.

In S210, at a first stage, the input signal connected to the signal input terminal hops from a first potential to a second potential to control the gate driving circuit to perform the second working mode.

The first potential and the second potential are different potentials. For example, the first potential is a low potential, and the second potential is a high potential. At this stage, the input module is turned off. The first node maintains the first potential. The storage module inverts the first potential into the second potential and then outputs the second potential. For the driving process at this stage, reference may be made to the specific explanation of the first stage T01 in FIG. 14 and is not repeated here.

In S220, at a second stage, the input signal maintains the second potential to control the gate driving circuit to perform the first working mode and the second working mode alternately.

At this stage, in the first working mode, the input module is turned on and transmits the second potential of the input signal to the first node, and the storage module inverts the second potential into the first potential and then outputs the first potential. In the second working mode, the input module is turned off, the first node maintains the second potential, and the storage module inverts the second potential into the first potential and then outputs the first potential. For the driving process at this stage, reference may be made to the specific explanation of the second stage T02 in FIG. 14 and is not repeated here.

In S230, at a third stage, the input signal hops from the second potential to the first potential to control the gate driving circuit to perform the second working mode.

At this stage, the input module is turned off. The first node maintains the second potential. The storage module inverts the second potential into the first potential and then outputs the first potential. For the driving process at this stage, reference may be made to the specific explanation of the third stage T03 in FIG. 14 and is not repeated here.

In S240, at a fourth stage, the input signal maintains the first potential to control the gate driving circuit to perform the first working mode and the second working mode alternately.

At this stage, in the first working mode, the input module is turned on and transmits the first potential of the input signal to the first node, and the storage module inverts the first potential into the second potential and then outputs the second potential. In the second working mode, the input module is turned off, the first node maintains the first potential, and the storage module inverts the first potential into the second potential and then outputs the second potential. For the driving process at this stage, reference may be made to the specific explanation of the fourth stage T04 in FIG. 14 and is not repeated here.

Based on the preceding embodiments, optionally, for an output module in the gate driving circuit, in the first working mode and the second working mode, the output module inverts the potential of the output terminal of the storage module and then outputs the inverted potential of the output terminal of the storage module to a signal output terminal. That is, in the entire driving process, the output module performs inversion on the signal output by the storage module; and/or, for a transmission control module in the gate driving circuit, in the first working mode, the transmission control module is controlled to be turned off, and in the second working mode, the transmission control module is controlled to be turned on. That is, in the entire driving process, the on state of the transmission control module is always opposite to the on state of the input module.

Figure 22:
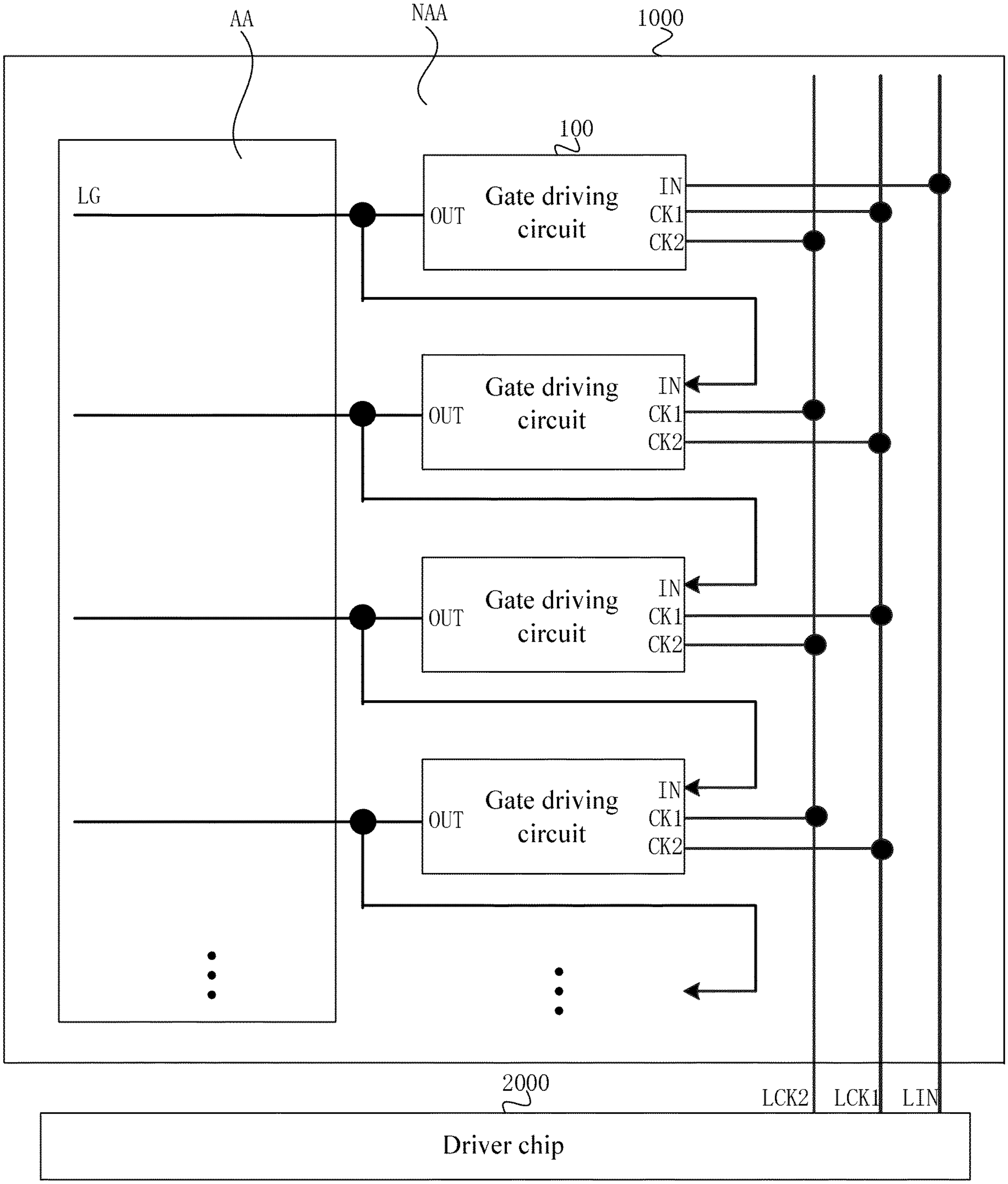
FIG. 22 is a structural diagram of a display device according to an embodiment of the present invention.

An embodiment of the present invention further provides a display panel. The display panel includes the gate driving circuit provided in any embodiment of the present invention and has corresponding beneficial effects. Exemplarily, the display device may be, for example, a display screen, a mobile phone, a watch, or a notebook. FIG. 22 is a structural diagram of a display device according to an embodiment of the present invention. Referring to FIG. 22, exemplarily, a gate driving circuit 200 includes an input module, a storage module, and an output module. The display device includes multi-level gate driving circuits 100 connected in a cascade manner. Specifically, a signal input terminal IN of a first-level gate driving circuit 100 is connected to an input signal line LIN. A signal output terminal OUT of a current-level gate driving circuit 100 is connected to a signal input terminal IN of a next-level gate driving circuit 100. Specifically, the display device may include a display panel 1000 and a driver chip 2000. The multi-level gate driving circuits 100 may be disposed in a non-display region AA. Signal output terminals OUT of the multi-level gate driving circuits 100 may be connected to corresponding gate lines LG. The gate lines LG may extend to a display region AA and be configured to supply control signals to gates of corresponding transistors in pixel circuits (not shown) in the display region AA. The driver chip 2000 may be connected to the input signal line LIN to supply an input signal to the first-level gate driving circuit 100.

Based on the preceding embodiments, optionally, the display device further includes a first power signal line (not shown) and a second power signal line (not shown) that are configured to transmit a first power signal and a second power signal respectively. First power terminals of the multi-level gate driving circuits 100 are each connected to the first power signal line. Second power terminals of the multi-level gate driving circuits 100 are each connected to the second power signal line.

With continued reference to FIG. 22, based on the preceding embodiments, optionally, the display device further includes a first clock signal line LCK1 and a second clock signal line LCK2. The first clock signal line LCK1 is connected to a first clock terminal CK1 of the odd-level gate driving circuit 100 and a second clock terminal CK2 of the even-level gate driving circuit 100. The second clock signal line LCK2 is connected to a second clock terminal CK2 of the odd-level gate driving circuit 100 and a first clock terminal CK1 of the even-level gate driving circuit 100. On the same occasion, a signal transmitted by the first clock signal line LCK1 and a signal transmitted by the second clock signal line LCK2 are mutually inverse signals. A high-potential duty cycle of signals transmitted by the first clock signal line LCK1 and a high-potential duty cycle of signals transmitted by the second clock signal line LCK2 are each 50%.

Figure 23:
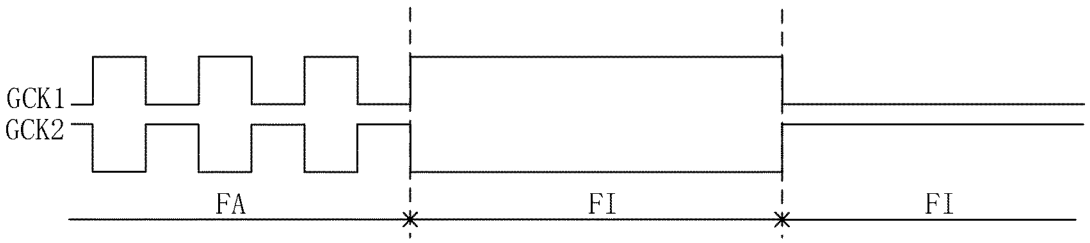
FIG. 23 is a waveform diagram of a signal transmitted in a clock signal line according to an embodiment of the present invention.

FIG. 23 is a waveform diagram of a signal transmitted in a clock signal line according to an embodiment of the present invention. Referring to FIG. 23, based on the preceding embodiments, optionally, in a refresh frame FA, a signal GCK1 transmitted by the first clock signal line LCK1 and a signal GCK2 transmitted by the second clock signal line LCK2 are each a pulse signal so that output signals of the multi-level gate driving circuits 100 are each a pulse signal. In a retention frame FI, a signal GCK1 transmitted by the first clock signal line LCK1 and a signal GCK2 transmitted by the second clock signal line LCK2 are each a direct current signal to reduce power consumption. In the retention frame FI, the signal GCK1 transmitted by the first clock signal line LCK1 may maintain a high potential or a low potential. Correspondingly, the signal GCK2 transmitted by the second clock signal line LCK2 may maintain a low potential or a high potential. The specific arrangement is made according to actual requirements.

Based on the preceding embodiments, optionally, the first clock signal line LCK1 and the second clock signal line LCK2 are provided with multiple signal supply manners, several of which are described hereinafter but do not serve as a limitation of the present invention.

Referring to FIG. 22, in an embodiment, optionally, different clock signal output terminals of the driver chip 2000 are connected to the first clock signal line LCK1 and the second clock signal line LCK2. The driver chip 2000 directly supplies clock signals to the first clock signal line LCK1 and the second clock signal line LCK2 respectively.

In another embodiment, optionally, the display device further includes an inverter, for example, disposed in the non-display region NAA. One clock signal output terminal of the driver chip 2000 is connected to one clock signal line and an input terminal of the inverter. An output terminal of the inverter is connected to the other clock signal line. For example, the driver chip 2000 is connected to the input terminal of the inverter and the first clock signal line LCK1. The output terminal of the inverter is connected to the second clock signal line LCK2. Such an arrangement can reduce the requirements of the display panel 1000 for an external input signal and reduce the requirements for the number of output channels of the driver chip 2000. Only one clock signal output terminal may be provided in the driver chip 2000 for the gate driving circuit 100, and another clock signal is generated through the inverter.

Figure 24:
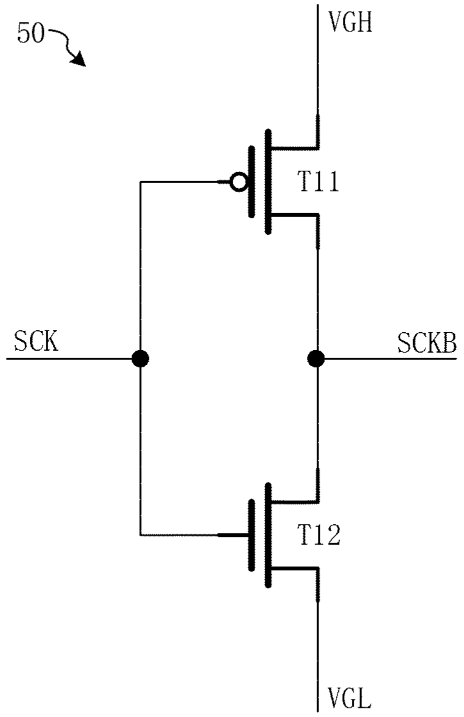
FIG. 24 is a structural diagram of an inverter according to an embodiment of the present invention.

For the structure of the inverter, refer to FIG. 24. Exemplarily, the inverter 50 includes an eleventh transistor T11 and a twelfth transistor T2. The channel type of the eleventh transistor T11 is opposite to the channel type of the twelfth transistor T12. A first electrode of the eleventh transistor T11 is connected to the first power signal VGH. A first electrode of the twelfth transistor T12 is connected to the second power signal VGL. A gate of the eleventh transistor T11 and a gate of the twelfth transistor T12 are each connected a clock signal output terminal of the driver chip 2000 to be connected to a clock signal SCK. A second electrode of the eleventh transistor T11 is connected to a second electrode of the twelfth transistor T12 and serves as the output terminal of the inverter 50 to be configured to output an inversion signal SCKB of the clock signal SCK. Exemplarily, the eleventh transistor T11 is a p-type transistor, and the twelfth transistor T12 is an n-type transistor.

It is to be noted that the structure and driving method of the gate driving circuit have been explained in detail in the preceding embodiments. For the content not explained in detail in this embodiment, reference may be made to explanations in the preceding embodiments and is not repeated here.

It is to be understood that various forms of processes shown above may be adopted with steps reordered, added or deleted. For example, the steps described in the present invention may be performed in parallel, sequentially or in different sequences, as long as the desired results of the technical solutions of the present invention can be achieved, and no limitation is imposed herein.

The preceding embodiments do not limit the scope of the present invention. It is to be understood by those skilled in the art that various modifications, combinations, sub-combinations, and substitutions may be performed according to design requirements and other factors. Any modification, equivalent substitution, improvement or the like made within the spirit and principle of the present invention is within the scope of the present invention.

What is claimed is:

1. A gate driving circuit, comprising:

an input module, wherein the input module is connected to each of a first node and a signal input terminal of the gate driving circuit and configured to control a potential of the first node according to a potential of the signal input terminal and transmit a potential hop of the signal input terminal to the first node in a delayed manner; and a storage module, wherein an input terminal of the storage module is connected to the first node, and the storage module is configured to store the potential of the first node and control a potential of an output terminal of the storage module according to the potential of the first node.

2. The gate driving circuit according to claim 1, further comprising an output module, wherein the output module is connected between the output terminal of the storage module and a signal output terminal of the gate driving circuit, and the output module is configured to control a potential of the signal output terminal of the gate driving circuit according to the potential of the output terminal of the storage module;

the storage module is configured to invert the potential of the first node and then outputs the inverted potential of the first node to the output terminal of the storage module; and the output module is configured to invert the potential of the output terminal of the storage module and then outputs the inverted potential of the output terminal of the storage module to the signal output terminal of the gate driving circuit.

3. The gate driving circuit according to claim 2, wherein the output module comprises a ninth transistor and a tenth transistor, a gate of the ninth transistor and a gate of the tenth transistor are each connected to the output terminal of the storage module, a first electrode of the ninth transistor is connected to a first power terminal, a first electrode of the tenth transistor is connected to a second power terminal, and a second electrode of the ninth transistor and a second electrode of the tenth transistor are each connected to the signal output terminal of the gate driving circuit;

wherein a channel type of the ninth transistor is opposite to a channel type of the tenth transistor;

the tenth transistor is an n-type transistor; and the tenth transistor comprises a second gate, and the second gate of the tenth transistor is connected to a third power terminal.

4. The gate driving circuit according to claim 1, wherein the storage module comprises:

a first inversion unit, wherein a control terminal of the first inversion unit is connected to the first node, a first input terminal of the first inversion unit is connected to a first power terminal, a second input terminal of the first inversion unit is connected to a second power terminal, and an output terminal of the first inversion unit is connected to the output terminal of the storage module; and a second inversion unit, wherein a control terminal of the second inversion unit is connected to the output terminal of the storage module, a first input terminal of the second inversion unit is connected to the first power terminal, a second input terminal of the second inversion unit is connected to the second power terminal, and an output terminal of the second inversion unit is connected to the first node;

wherein the first inversion unit comprises a first transistor and a second transistor, a gate of the first transistor and a gate of the second transistor are each connected to the first node, a first electrode of the first transistor is connected to the first power terminal, a first electrode of the second transistor is connected to the second power terminal, and a second electrode of the first transistor and a second electrode of the second transistor are each connected to the output terminal of the first inversion unit; and wherein the second inversion unit comprises a third transistor and a fourth transistor, a gate of the third transistor and a gate of the fourth transistor are each connected to the output terminal of the storage module, a first electrode of the third transistor is connected to the first power terminal, a first electrode of the fourth transistor is connected to the second power terminal, and a second electrode of the third transistor and a second electrode of the fourth transistor are each connected to the output terminal of the second inversion unit;

wherein a channel type of the first transistor is opposite to a channel type of the second transistor, a channel type of the third transistor is opposite to a channel type of the fourth transistor, and the channel type of the first transistor is the same as the channel type of the third transistor;

the second transistor and the fourth transistor are each an n-type transistor; and the second transistor and the fourth transistor each comprise a second gate, and the second gate of the second transistor and the second gate of the fourth transistor are each connected to a third power terminal.

5. The gate driving circuit according to claim 4, further comprising a transmission control module connected between the first node and the output terminal of the second inversion unit and configured to control whether the first node communicates with the output terminal of the second inversion unit, wherein the transmission control module comprises a fifth transistor connected between the first node and the output terminal of the second inversion unit, and a gate of the fifth transistor is connected to a second clock terminal; and the transmission control module comprises a sixth transistor connected between the first node and the output terminal of the second inversion unit, and a gate of the sixth transistor is connected to a first clock terminal;

a signal connected to the first clock terminal and a signal connected to the second clock terminal are mutually inverse signals, and a channel type of the fifth transistor is opposite to a channel type of the sixth transistor;

the sixth transistor is an n-type transistor; and the sixth transistor comprises a second gate, and the second gate of the sixth transistor is connected to the third power terminal.

6. The gate driving circuit according to claim 4, wherein the input module comprises a seventh transistor connected between the signal input terminal and the first node, and a gate of the seventh transistor is connected to a first clock terminal; and the input module further comprises an eighth transistor connected between the signal input terminal and the first node, and a gate of the eighth transistor is connected to a second clock terminal;

a signal connected to the first clock terminal and a signal connected to the second clock terminal are mutually inverse signals, and a channel type of the seventh transistor is opposite to a channel type of the eighth transistor;

the eighth transistor is an n-type transistor; and the eighth transistor comprises a second gate, and the second gate of the eighth transistor is connected to the third power terminal.

7. The gate driving circuit according to claim 4, wherein a potential connected to the first power terminal is higher than a potential connected to the second power terminal, a potential connected to the third power terminal is lower than or equal to the potential connected to the second power terminal.

8. A driving method of a gate driving circuit, applied to the gate driving circuit according to claim 1 and comprising:

in a first working mode, controlling the input module to be turned on, wherein the input module transmits a potential of the signal input terminal to the first node; and in a second working mode, controlling the input module to be turned off, wherein the storage module stores the potential acquired by the first node before the input module is turned off.

9. The driving method of a gate driving circuit according to claim 8, comprising:

at a first stage, an input signal connected to the signal input terminal hopping from a first potential to a second potential to control the gate driving circuit to perform the second working mode in which the input module is turned off, the first node maintains the first potential, and the storage module inverts the first potential into the second potential and then outputs the second potential;

at a second stage, the input signal maintaining the second potential to control the gate driving circuit to perform the first working mode and the second working mode alternately, wherein in the first working mode, the input module is turned on and transmits the second potential of the input signal to the first node, and the storage module inverts the second potential into the first potential and then outputs the first potential; and in the second working mode, the input module is turned off, the first node maintains the second potential, and the storage module inverts the second potential into the first potential and then outputs the first potential;

at a third stage, the input signal hopping from the second potential to the first potential to control the gate driving circuit to perform the second working mode in which the input module is turned off, the first node maintains the second potential, and the storage module inverts the second potential into the first potential and then outputs the first potential; and at a fourth stage, the input signal maintaining the first potential to control the gate driving circuit to perform the first working mode and the second working mode alternately, wherein in the first working mode, the input module is turned on and transmits the first potential of the input signal to the first node, and the storage module inverts the first potential into the second potential and then outputs the second potential; and in the second working mode, the input module is turned off, the first node maintains the first potential, and the storage module inverts the first potential into the second potential and then outputs the second potential.

10. The driving method of a gate driving circuit according to claim 9, wherein the gate driving circuit comprises an output module; and in the first working mode and the second working mode, the output module inverts the potential of the output terminal of the storage module and then outputs the inverted potential of the output terminal of the storage module to a signal output terminal of the gate driving circuit.

11. The driving method of a gate driving circuit according to claim 9, wherein the gate driving circuit comprises a transmission control module configured to control whether a control terminal of a first inversion unit in the storage module communicates with an output terminal of a second inversion unit in the storage module;

in the first working mode, the transmission control module is controlled to be turned off; and in the second working mode, the transmission control module is controlled to be turned on.

12. The driving method of a gate driving circuit according to claim 8, wherein the gate driving circuit comprises an output module; and in the first working mode and the second working mode, the output module inverts the potential of the output terminal of the storage module and then outputs the inverted potential of the output terminal of the storage module to a signal output terminal of the gate driving circuit.

13. The driving method of a gate driving circuit according to claim 8, wherein the gate driving circuit comprises a transmission control module configured to control whether a control terminal of a first inversion unit in the storage module communicates with an output terminal of a second inversion unit in the storage module;

in the first working mode, the transmission control module is controlled to be turned off; and in the second working mode, the transmission control module is controlled to be turned on.

14. A display device, comprising the gate driving circuit according to claim 1, wherein the display device comprises an input signal line and multi-level gate driving circuits connected in a cascade manner, a signal input terminal of a first-level gate driving circuit among the multi-level gate driving circuits is connected to the input signal line, and a signal output terminal of a current-level gate driving circuit among the multi-level gate driving circuits is connected to a signal input terminal of a next-level gate driving circuit among the multi-level gate driving circuits.

15. The display device according to claim 14, wherein the gate driving circuit further comprises a first clock terminal and a second clock terminal; the display device further comprises a first clock signal line and a second clock signal line, the first clock signal line is connected to a first clock terminal of an odd-level gate driving circuit among the multi-level gate driving circuits and a second clock terminal of an even-level gate driving circuit among the multi-level gate driving circuits, and the second clock signal line is connected to a second clock terminal of the odd-level gate driving circuit and a first clock terminal of each of the even-level gate driving circuit.

16. The display device according to claim 15, wherein in a refresh frame, a signal transmitted by the first clock signal line and a signal transmitted by the second clock signal line are each a pulse signal.

17. The display device according to claim 15, wherein in a retention frame, a signal transmitted by the first clock signal line and a signal transmitted by the second clock signal line are each a direct current signal.

18. The display device according to claim 15, wherein on a same occasion, a signal transmitted by the first clock signal line and a signal transmitted by the second clock signal line are mutually inverse signals.

19. The display device according to claim 15, wherein a high-potential duty cycle of signals transmitted by the first clock signal line and a high-potential duty cycle of signals transmitted by the second clock signal line are each 50%.

20. The display device according to claim 15, further comprising a driver chip, wherein the driver chip is connected to each of the first clock signal line and the second clock signal line; or the display device further comprises an inverter, the driver chip is connected to an input terminal of the inverter and the first clock signal line, and an output terminal of the inverter is connected to the second clock signal line.

* * * * *